United States Patent [19]
Shirai et al.

[11] Patent Number: 6,025,596
[45] Date of Patent: Feb. 15, 2000

[54] METHOD FOR MEASURING EPITAXIAL FILM THICKNESS OF MULTILAYER EPITAXIAL WAFER

[75] Inventors: Hiroshi Shirai, Hadano; Kenji Akai, Tokuyama; Toshio Abe, Yokohama; Chikara Tojima, Hadano; Katsuyuki Iwata, Kudamatsu, all of Japan

[73] Assignee: Toshiba Ceramics Co., Ltd., Tokyo, Japan

[21] Appl. No.: 09/019,049

[22] Filed: Feb. 5, 1998

[30] Foreign Application Priority Data

Feb. 6, 1997 [JP] Japan ................................. 9-038472

[51] Int. Cl.[7] ...................................................... G01J 5/02
[52] U.S. Cl. ...................................................... 250/339.11
[58] Field of Search ........................ 250/339.11; 439/309

[56] References Cited

U.S. PATENT DOCUMENTS

| 5,400,265 | 3/1995 | Kauppinen | 364/576 |
| 5,740,226 | 4/1998 | Komiya | 378/70 |

OTHER PUBLICATIONS

Patent Abstract of Japan, abstract of N. Seiji et al, Apparatus and Method of Measurement of Film Thickness of Semiconductor Multilayer Thin Film, Japanese 7–4922, Jan. 10, 1995.
Patent Abstract of Japan, abstract of N. Seiji et al., "Semiconductor Film Thickness Measuring Device", Japanese 5–302816, Nov. 16, 1993.
Electronic Materials, vol. 28 No. 11, pp. 40–45, Nov. 1, 1989.
R. Fukasawa et al, "Japanese Journal of Optics", Analytical Estimation of the Multilayer Thickness Using the Intererometric Spectrometry, vol. 20, pp. 305–309, May 1991.
S. Kawata et al., "Applied Optics", Superresolution of Fourier transform spectroscopy data by the maximum entrophy method, vol. 22, No. 22, pp. 3593–3598, Nov. 15, 1983.

Primary Examiner—Constantine Hannaher
Assistant Examiner—Adrianne Riviere
Attorney, Agent, or Firm—Foley & Lardner

[57] ABSTRACT

In a measurement method for measuring the epitaxial film thickness of a multilayer epitaxial wafer, a reflectivity spectrum of a multilayer epitaxial wafer having at least two epitaxial layers of different electric characteristics is measured by using infrared radiation in a far infrared region of at least 500 cm$^{-1}$ or less, and frequency-analysis is performed on the reflection spectrum thus obtained by a maximum entropy method, and the film thickness of each epitaxial layer is calculated on the basis of the analysis spectrum thus obtained.

3 Claims, 16 Drawing Sheets

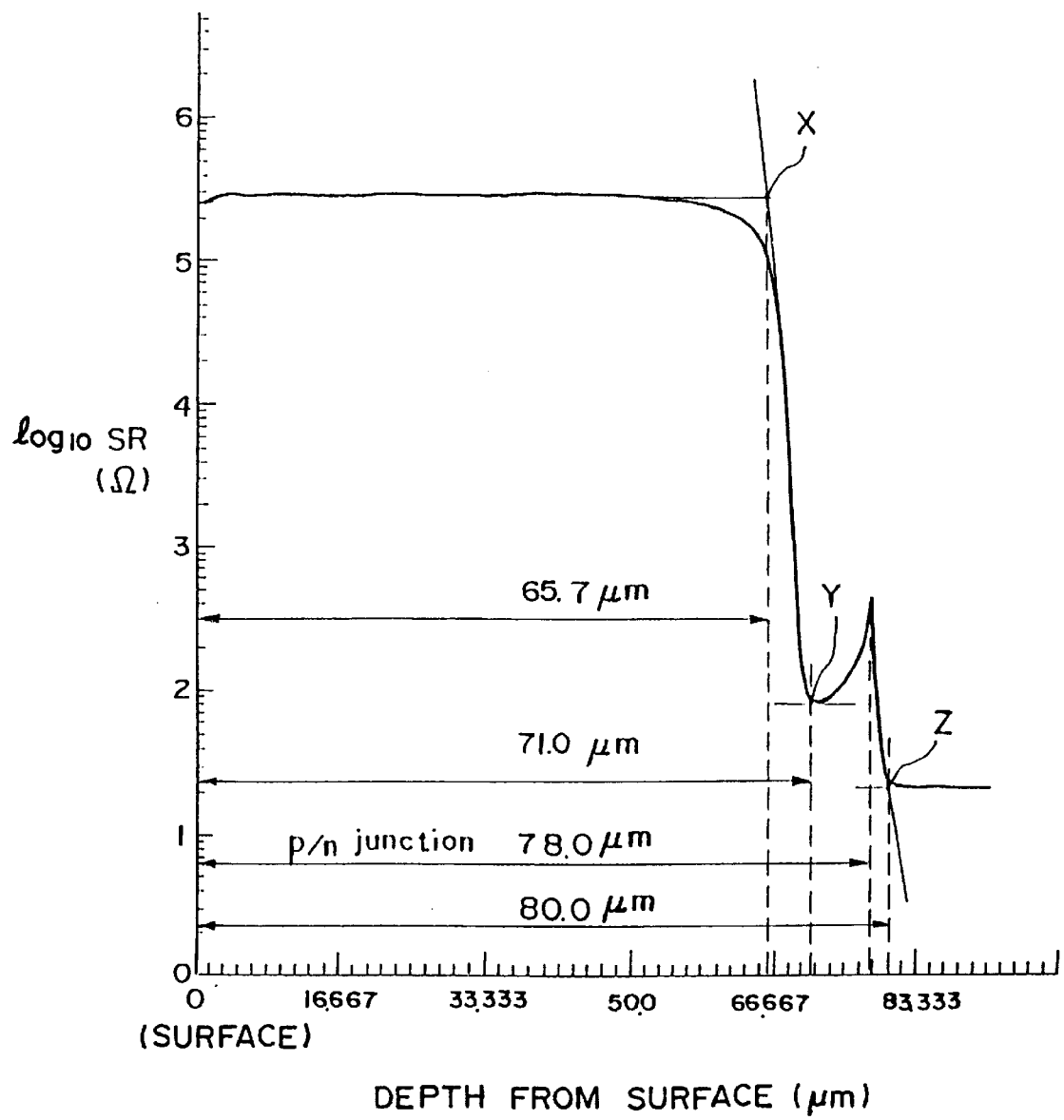

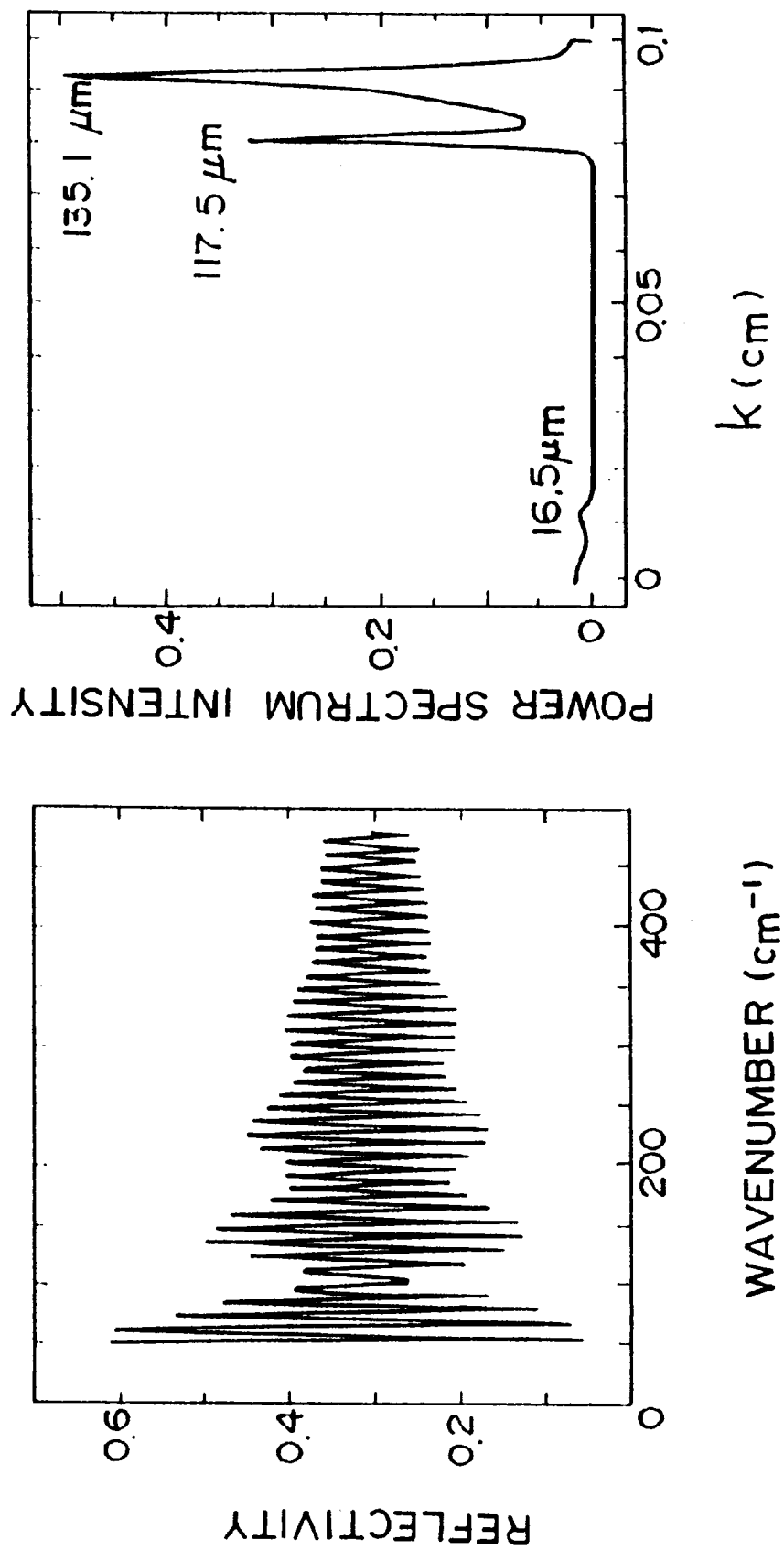

METHOD FOR MEASURING EPITAXIAL FILM THICKNESS OF MULTILAYER EPITAXIAL WAFER

BACKGROUND OF THE INVENTION

1. Field of the Invention

The present invention relates to a method for measuring the epitaxial film thickness of multilayer epitaxial wafer, and particularly to a method for measuring the epitaxial film thickness of two-layer epitaxial wafer for IGBT (Insulated Gate Bipolar Transistor) for use in a power device such as a switching element or the like under a non-destructive and non-contact state with high precision.

2. Description of Related Art

Epitaxial wafers having such a multilayer structure that epitaxial thin films having different electrical characteristics (hereinafter referred to as "epitaxial wafer") are formed in a multilayer structure (hereinafter referred to as "epitaxial wafer") such as IGBT wafer or the like have been increasingly applied to power devices, and much attention has been paid to such epitaxial wafers. The epitaxial film thickness is also an important factor to obtain devices having excellent characteristics from these multilayer-structure epitaxial wafers, so that it has been required to control the epitaxial film thickness with high precision in a manufacturing process. The control of the epitaxial film thickness first necessitates measurement of the thickness of an epitaxial film. The measurement of the thickness of an epitaxial film which is formed by inducing epitaxial growth on a silicon monocrystal substrate has been hitherto carried out in consideration of the relation with device characteristics. According to a conventional film thickness measurement method, the spreading resistance on a oblique polished surface of an epitaxial wafer is measured, that is, the conventional measurement is a destructive measurement. Accordingly, it has a problem in sampling, and thus a non-destructive measurement has been required.

In such a condition as described above, much attention has been paid to a film thickness measurement based on a middle infrared reflection spectroscopy which generally uses FTIR (Fourier Transform Infrared Spectrophotometer), and various applications thereto have been tried. According to the film thickness measurement using the FTIR method, a reflection spectrum of an epitaxial wafer is measured by using an infrared spectrophotometer, and an interference fringe pattern on the spectrum is obtained to analyze the interference fringe pattern. With this measurement, the film thickness can be measured on the basis of the interference fringe pattern by relatively simple analysis when the thin film formed on the substrate is a single layer. For example, the epitaxial film thickness of the single-layer epitaxial wafer can be detected by irradiating to a sample infrared ray of a middle infrared region of 4000 to 400 cm$^{-1}$ (in wavenumber) and then measuring the interference fringe between reflected light at the interface between the substrate and the epitaxial layer (hereinafter referred to as "epitaxial layer/substrate interface") and reflected light at the surface of the epitaxial wafer. In general, the substrate of the epitaxial wafer has a high carrier concentration of $10^{18}$ to $10^{19}$ cm$^{-3}$ level. On the other hand, the carrier concentration of the epitaxial layer is lower than the substrate. Therefore, the incident infrared ray is transmitted through the epitaxial film layer of low concentration, reflected at the epitaxial-layer/substrate interface and then interferes with the reflected light at the surface of the wafer, so that interference fringe is observed on the reflection spectrum. That is, the interference fringe is formed due to the difference in optical length between the reflected light at the epitaxial-layer/substrate interface and the reflected light at the wafer surface, and the epitaxial film thickness is measured on the basis of the relationship in which the period of the interference fringe is inversely proportional to the epitaxial film thickness.

On the other hand, with respect to a multilayer film, reflected light at the interface between respective epitaxial layers other than the reflected light at the epitaxial-layer/substrate interference also contributes to the interference fringe pattern. Accordingly, the interference pattern thus obtained is complicated and it is very difficult to measure the film thickness by directly performing waveform analysis of the interference pattern. Therefore, there has been proposed a method of measuring the thickness of each layer of the multilayer-structure film. For example, with respect to compound semiconductors such as GaAs group, etc., there has been proposed a method in which the epitaxial film thickness of each layer of the multilayer epitaxial film structure is measured by performing the reflection measurement in the range from the near infrared region to the middle infrared region in the same manner as the single-layer epitaxial layer, and then subjecting the reflection measurement result to Fourier Transform. That is, according to this method, by using the FTIR method, light in the wavenumber region from the visible area to the infrared region is irradiated to a compound semiconductor having a multilayer film structure to obtain a reflection spectrum, film interference components which are obtained from the reflection spectrum are subjected to inverse Fourier Transform to obtain a so-called spatialgram, and then the multilayer film thickness is measured on the basis of the waveform analysis of the spatialgram ("Electronic Materials" Vol.28 (No. 11), pp40–45 (1989), "Optics" Vol.20, pp305–309 (1991)). Further, with respect to the measurement of the multilayer film thickness, Japanese Laid-open Patent Application NO. Hei-5-302816 proposes that the measurable wavenumber range is extended by using a plurality of photodetectors, light-transmissible members or light sources to enhance the measurement limitation of the film thickness, and Japanese Laid-open Patent Application No. Hei-7-4922 proposes that the waveform of a theoretical interference spectrum is calculated on the basis of the measurement value of the film thickness obtained from the spatialgram, and then waveform fitting is performed to thereby measure the film thickness with high precision.

However, according to the middle infrared reflection spectroscopy, it is impossible to measure the epitaxial film thickness of each layer of a multilayer structure epitaxial wafer in which at least similar single crystalline silicon two layers having different electrical characteristics are formed on a single crystalline silicon substrate. However, for an epitaxial wafer having a two-layer structure, the total film thickness of the first and second layers can be detected by measuring the interference fringe between the reflected light at the first layer/substrate interface and the reflected light at the wafer surface.

As shown in FIGS. 16A to 16D (FIG. 16A is a schematic diagram showing a general two-layer structure of an IGBT wafer which is a target of the present invention, FIGS. 16B and 16C are schematic structural diagrams showing two typical kinds of two-layer epitaxial wafers, and FIG. 16D shows infrared ray reflection in the two-layer epitaxial wafer), in the case of the two-layer epitaxial wafer, it is general that two layers having different electrical characteristics, that is, a first layer of 5 to 25 μm in thickness which is doped with phosphorus (P) or boron (B) of high concentration (specific resistance of about 30 to 100 mΩcm) and a second layer of 30 to 130 μm in thickness which is doped with phosphorus (P) or boron (B) of low concentration (specific resistance of about 10 Ωcm or more) are continuously epitaxially grown on a single crystalline silicon substrate which is doped with boron or antimony (Sb) of relatively high concentration (specific resistance of about 25 to 20 mΩcm or less). In this case, the carrier concentration of the first layer is not sufficiently high, and the difference in carrier concentration between the first and second layers is not sufficiently high, and thus it is generally difficult to measure the interference fringe between the reflected light at the second layer/first layer interface and the reflected light at the wafer surface to measure the film thickness of the second layer, and the interference fringe between the reflected light at the first layer/substrate interface and the reflected light at the second/first interface to measure the film thickness of the second layer.

As described above, it is difficult to measure the epitaxial film thickness of each layer of the multilayer epitaxial wafer by the analysis using the FTIR method, however, it is possible to measure the total film thickness of the overall multilayer epitaxial film thickness. Accordingly, the following methods may be used to determine the epitaxial film thickness of each layer in the manufacturing process. According to the first method, as a test sample, only a first layer is epitaxially grown and then the film thickness thereof is measured as the thickness of the first layer by the FTIR method. Subsequently, a first layer and a second layer are continuously epitaxially grown under the same condition as the case where only the first layer is formed, and the total film thickness of the first layer and the second layer are measured by the FTIR method, and the subtraction of the film thickness between the above two samples is calculated as the film thickness of the second layer. According to the second method, the growth time of each epitaxial film of the first and second layers is measured, and the film thickness of each epitaxial layer is calculated by dividing the total film thickness of the first and second layers by the growth time of each epitaxial layer. These methods enable the non-destructive measurement of the epitaxial film thickness of the first and second layers of products, however, this method is not preferable because the measurement contains some estimation.

SUMMARY OF THE INVENTION

The present invention has been implemented in view of the foregoing problem of the conventional measurement of the film thickness of each of at least two layers having different electrical characteristics which are formed on a single crystalline silicon substrate, and has an object to establish a method for effectively measuring the film thickness of each epitaxial film under the non-destructive and non-contact state with excluding any estimate factor. That is, the present invention has an object to provide a measurement method which can be particularly suitably applied to the film thickness measurement of epitaxial wafers having the structure as shown in FIGS. 16B and 16C.

Further, the present invention has an object to facilitate the control of the epitaxial film thickness which effects the device characteristics of a multilayer-structure epitaxial wafer which has been noted as being used for a power device.

In order to attain the above objects, the inventors of this application have earnestly studied measurement data based on a reflection spectroscopy of each type thin film, waveform analysis of data, etc., and as a result they have found out that the light reflectivity of carriers is more strong at the long wavelength side in the measurement of the infrared spectroscopy. On the basis of this knowledge, the inventors have performed infrared reflection measurements on two-layer structure epitaxial wafers with the far infrared region at the center of the measurement region, and finally they have further knowledge that the interference fringe between the reflected light at the second layer/first layer interface and the reflected light at the wafer surface and the interference fringe between the reflected light at the first layer/substrate interface and the reflected light at the second layer/first layer interface can be measured in the reflection spectrum thus obtained. Accordingly, the film thickness of each epitaxial film can be detected by performing waveform analysis (frequency analysis) of the interference fringe thus obtained.

According to the present invention, there is provided a measurement method comprising the steps of: (1) a far infrared reflectivity measuring step for measuring a reflectivity spectrum of a multilayer epitaxial wafer having at least two epitaxial layers of different electric characteristics by using infrared radiation in a far infrared region of at least 500 $cm^{-1}$ or less, (2) an analyzing step for frequency-analyzing the reflection spectrum obtained in the far infrared reflectivity measuring step by a maximum entropy method, and (3) a step for calculating the film thickness of each epitaxial layer on the basis of the analysis spectrum obtained in the analyzing step.

The measurement method of the epitaxial film thickness of the multilayer epitaxial wafer according to the present invention is suitably applicable to the measurement of the film thickness of each epitaxial layer of a multilayer epitaxial wafer comprising a boron-doped substrate having a specific resistance of 25 mΩcm or less, a phosphorus-doped first epitaxial layer which has a specific resistance of 90 to 30 mΩcm and a thickness of 5 to 25 μm, and a phosphorus-doped second epitaxial layer which has a specific resistance of 10 Ωcm or more and a thickness of 40 to 130 μm. Further, the present invention is suitably applicable to the measurement of the film thickness of each epitaxial layer of a multilayer epitaxial wafer comprising an antimony-doped substrate having a specific resistance of 20 mΩcm or less, a boron-doped first epitaxial layer which has a specific resistance of 100 to 50 mΩcm and a thickness of 5 to 25 μm, and a boron-doped second epitaxial layer which has a specific resistance of 10 Ωcm or more and a thickness of 30 to 100 μm.

According to the present invention, since far infrared radiation of at least 500 $cm^{-1}$ or less is used to measure the epitaxial film thickness for the epitaxial wafer having the multilayer structure in which at least two layers of carrier-doped epitaxial films are formed on a single crystalline silicon substrate, the interference fringe between the reflected light at the second layer/first layer interface and the reflected light at the wafer surface and the interference fringe between the reflected light at the first layer/substrate interface and the reflected light at the second layer/first layer interface, which are not separated from each other by the conventional middle infrared reflection measurement, can be observed in a spectrum in which they are superposed on the interference fringe between the reflected light at the first layer/substrate interface and the reflected light at the wafer surface which can be measured by the conventional middle infrared reflection method so that these interference fringes can be separately measured. Accordingly, each epitaxial film thickness can be finally calculated by performing the waveform analysis (frequency-analysis) of the measured reflection spectrum. Further, according to the present invention, the reflection spectrum thus obtained is under a superposition state of the interference fringes. Therefore, a clear sharp resultant spectrum cannot be obtained by a conventional Fourier analysis method (for example, FFT (Fast Fourier Transform)). On the other hand, the presents invention uses a maximum entropy method (hereinafter referred to as "MEM"), and thus according to the present invention, there can be obtained a frequency-analysis spectrum having sharp peaks which are based on the interference fringe between the reflected light at the second layer/fist layer interface and the reflected light at the wafer surface, the interference fringe between the reflected light at the first layer/substrate interface and the reflected light at the wafer surface, and the interference fringe between the reflected light at the first layer/substrate interface and the reflected light at the second layer/first layer interface, respectively. Therefore, each epitaxial film thickness of the second layer, the second layer+ the first layer, and the first layer can be efficiently determined with high reproducibility.

BRIEF DESCRIPTION OF THE DRAWINGS

FIG. 6 is a graph showing an SR value profile in the depth direction of the sample 2 of the embodiment according to the present invention;

FIG. 13A shows a reflection spectrum in the far infrared region of a sample 10 of the embodiment according to the present invention, and FIG. 13B shows an resultant spectrum of the reflection spectrum of FIG. 13A which is obtained by the MEM analysis;

DETAILED DESCRIPTION OF THE PREFERRED EMBODIMENT

Figure 1:
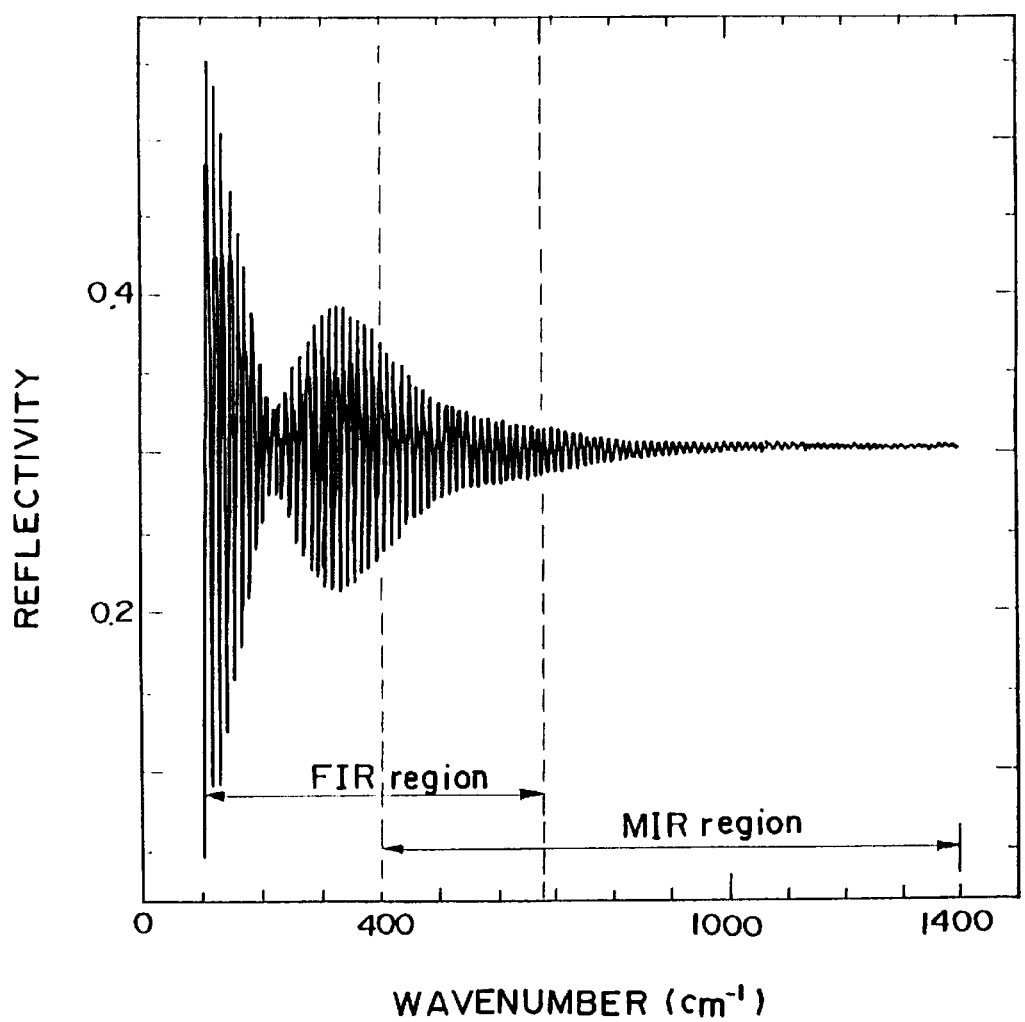
FIG. 1 is a graph showing a reflection spectrum in the range from a middle infrared region to a far infrared region of a sample 1 according to an embodiment of the present invention.

Preferred embodiments according to the present invention will be described hereunder with reference to the accompanying drawings.

According to the present invention, the measurement region for FTIR is shifted to a far infrared region which is at a longer wavelength side than the normal epitaxial film thickness measurement, and the MEM analysis is used for the analysis of the reflection spectrum thus obtained. It is completely novel that the MEM analysis is applied to the waveform analysis for controlling the epitaxial film thickness in the manufacturing process of semiconductor wafers, and this technique has been first implemented by the inventors of this application. First, the reason why the maximum entropy method (MEM) is used as the waveform analysis by the inventors will be first described.

It has been found out in the infrared reflection spectroscopic measurement of the epitaxial wafer according to the present invention that the interference fringe between the reflected light at the first layer/substrate interface and the reflected light at the wafer surface is conventionally dominant in the general middle infrared region. Further, it has been also found out that in the far infrared reflection spectrum, the interference fringe between the second layer/ first layer interface and the reflected light at the wafer surface and the interference fringe between the first layer/ substrate interface and the reflected light at the second layer/first layer interface are also measured. In this case, in a two-layer structure epitaxial wafer in which the epitaxial film thickness of the first layer is further smaller than the epitaxial film thickness of the second layer, the periods on the reflection spectra of the two kinds of interference fringes, i.e., the interference fringe between the reflected light at the first layer/substrate interface and the reflected light at the wafer surface and the interfere fringe between the reflected light at the second layer/first layer interface and the reflected light at the wafer surface, are approximate to each other, and thus the spectral waveform becomes dense (period of wave becomes short). As a result, in the reflection spectrum which is actually measured in the far infrared region, an interference fringe having these two kinds of near periods and an interference fringe having a long period between the reflected light at the first layer/substrate interface and the reflected light at the second layer/first layer interface are observed as being superposed on each other.

According to the inventors, it has been found that it is difficult to obtain a clear spectral peak even by subjecting the reflection spectrum as described above to FFT which is a general Fourier Transform method as in the case of the prior art. Therefore, in the present invention, the maximum entropy analysis which has not been hitherto generally used is tried in place of FFT. The MEM analysis was first proposed for underground surveys, and then it has been applied to the correlation between the activity period and the annual temperature variation of the sun, the earthquake wave analysis, etc. Further, it has been also applied to a signal processing field, and there is a report on enhancement of the resolution of spectra obtained by FTIR ("Applied Optics", Vol 22 (NO. 22), pp3593–3598 (1983)). The MEM analysis estimates the spectrum of the overall signal from finite data. As compared with the conventional waveform analysis such as FFT or the like, the estimation of the spectra can be performed on the basis of shorter data, and also the high-resolution frequency analysis spectrum can be estimated.

According to the inventors, as is apparent from the embodiments as described below, the MEM analysis was actually performed on the reflection spectrum obtained by FTIR measurements in the far infrared region, and proved that a very clear and sharp frequency-analyzed peak could be obtained. Accordingly, the period of each interference fringe which are components of the reflection spectrum can be obtained. Further, even when the reflection spectrum in the middle infrared region is subjected to the MEM analysis as in the case of the FTIR measurement of compound semiconductors having the above multilayer structure, as predicted as described above, the frequency-analyzed peak corresponding to the interference fringe between the reflected light at the first layer/substrate interface and the reflected light at the wafer surface is intensified, however, the peak corresponding to the interference fringe between the reflected light at the second layer/first layer interface and the reflected light at the wafer surface and the peak corresponding to the interference fringe between the reflected light at the first layer/substrate interface and the reflected light at the second layer/first layer interface are not obtained, so that the each epitaxial film thickness of the multilayer epitaxial wafer cannot be measured.

EMBODIMENTS

The present invention will be described in more detail by using embodiments, however, the present invention is not limited to the following embodiments.

Embodiment 1

Each of eight kinds of two-layer structure epitaxial wafers ($n^-/n^+/p^{++}$ structure, dopant: $P^-/P^+/B^{++}$) was formed on a single crystalline silicon substrate of 10 to 20 mΩcm in specific resistance by the conventional epitaxial method so that target values for the film thickness (Tvg) and the specific resistance (ρ) shown in table 1 were obtained. The reflection spectrum in the middle infrared and far infrared regions was measured for each epitaxial wafer thus obtained. Further, the value of spreading resistance (hereinafter referred to as "SR") of the oblique polished surface was measured.

The reflection spectrum in the middle infrared region and in the far infrared region were measured. That is, in the middle infrared (MIR) 1400 to 400 $cm^{-1}$ region, the measurement was performed under the following condition (light source: SiC, beam splitter: Ge/KBr, detector: DTGS (Deuterated Triglycine Sulfate)(CsI) window plate), in the 680 to 105 $cm^{-1}$ region (with the main far infrared (FIR) region), the measurement was performed under the condition (light source: SiC, beam splitter: Mylar polyester film (3.5 μm in thickness), detector: DTGS (polyethylene (PE) window plate)), and in supplemental FIR (105 to 30 $cm^{-1}$) region, the measurement was performed under the following condition (light source: mercury lamp, beam splitter: Mylar polyester film (3.5 μm in thickness), detector: DTGS (PE window plate).

When the reflection spectrum in the middle infrared region (beam splitter Ge/KBr) and the reflection spectrum in the far infrared region (beam splitter Mylar polyester film (3.5 μm in thickness) are set to a continuously sequential infrared reflection spectrum, 600 $cm^{-1}$cm was set as the boundary of both the regions. In the SR measurement, the resistance profile in the depth direction of the wafer section was determined, and it was used as criteria for the first and second layers.

Table 1
(Frequency Analysis)

Next, the frequency analysis of the measured reflection spectrum was performed by using the maximum entropy method (MEM), and the epitaxial film thickness d (μm) was calculated according to the following equation (1)

$$d = 10^4 \cdot K_p / 2n \tag{1}$$

In the equation (1), $k_p$ represents position of the peak (cm) which is appeared in the result of MEM analysis, and n represents refractive index. In this case, 3.42 which is the refractive index of intrinsic semiconductor silicon in the infrared region is used as the value of n. This refractive index is varied in accordance with the type or concentration of dopant in silicon. Therefore, in order to measure the epitaxial film thickness with more precision, it is preferable to select the refractive index in accordance with the type or concentration of the dopant.

(Sample 1)

First, the measurement spectrum which is obtained by the middle and far infrared reflection measurements of the two-layer structure epitaxial wafer of the sample 1 shown in the table 1, and the result analyzed by the MEM method will be described.

Figure 2A:
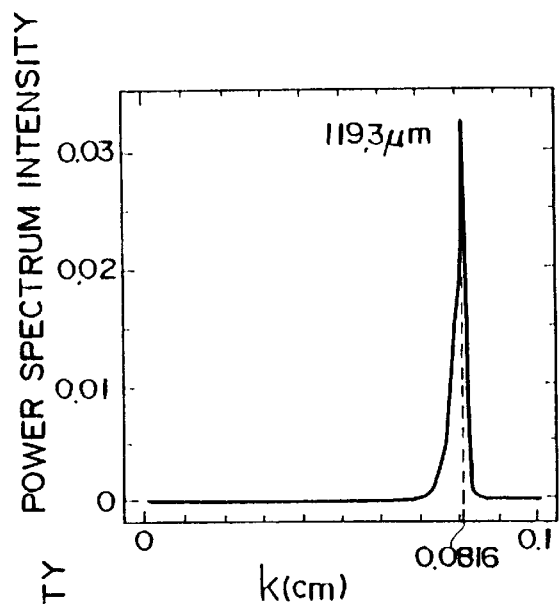
FIGS. 2A, 2B and 2C show resultant spectra which are obtained by MEM analysis of the reflection spectrum of FIG. 1 in the middle infrared region, in the far infrared region and in the range from the middle infrared region to the far infrared region, respectively.
Figure 2B:
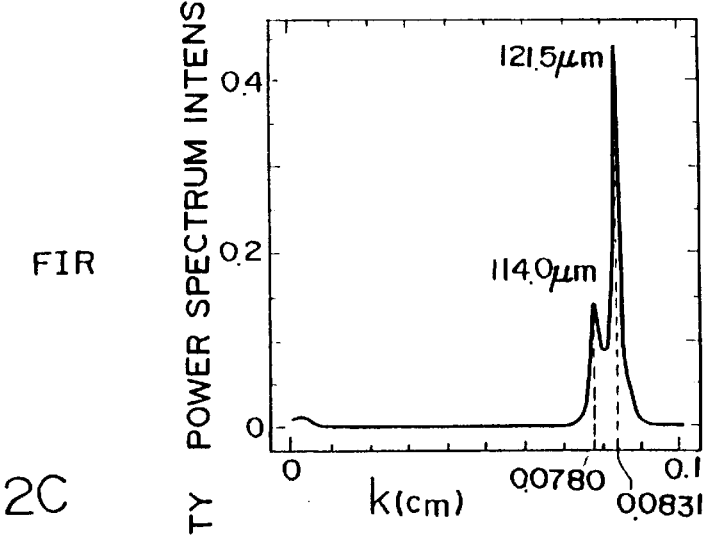
Figure 2C:
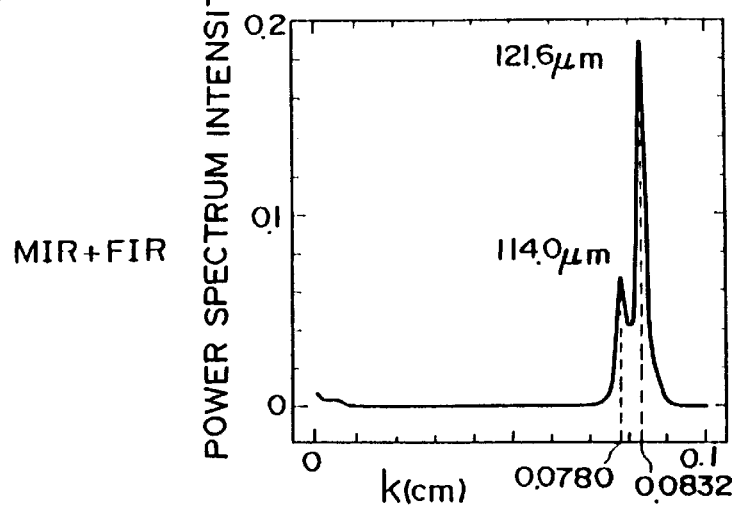

FIG. 1 shows a reflection spectrum of the two-layer structure epitaxial wafer of the sample 1 in the middle infrared and far infrared regions. FIGS. 2A to 2C show spectra which is obtained by frequency-analyzing the spectrum of FIG. 1 according to the MEM method, wherein FIG. 2A shows the MEM-analyzed result in the middle infrared (MIR) region (1400 to 400 $cm^{-1}$) of the reflection spectrum, FIG. 2B shows the MEM-analyzed result in the range covering the far infrared (FIR) region (mainly including 680 to 105 $cm^{-1}$), and FIG. 2C shows the MEM-analyzed result in the (FIR+MIR) region (1400 to 105 $cm^{-1}$). The reflection spectrum in the infrared region of the two-layer epitaxial wafer of FIG. 1 can be basically explained as the product of a beat and a monotonically-decreasing function as described below.

The beat is obtained by superposing the interference fringe on the spectrum between the reflected light at the first layer/substrate interface and the reflected light at the wafer surface and the interference fringe between the reflected light at the second layer/first layer interference and the reflected light at the wafer surface. The monotonically-decreasing function represents the tendency that the amplitude of the interference fringe monotonically decreases because the reflectivity of carriers is reduced as the frequency is shifted to a high wavenumber (short wavelength) side.

FIGS. 2A to 2c are the MEM-analyzed results obtained by separately performing the MEM analysis on the reflection spectrum of FIG. 1 in the MIR region, the FIR region and (MIR+FIR) region, respectively. The ordinate represents the relative value of the power spectrum intensity, and the abscissa represents the frequency analysis value (cm) k of the reflection spectrum. According to the MEM analysis of the reflection spectrum in the MIR region shown in FIG. 2A, there appears only a peak which seems to be based on the interference fringe between the reflected light at the first layer/substrate interface and the reflected light at the wafer surface (the thickness of (the first layer+the second layer) obtained by substituting $k_p=0.0816$ into the equation (1): 119.9 μm). According to the MEM analysis of the reflection spectrum shown in FIG. 2B, there appears a peak which seems to be based on the interference fringe between the reflected light at the first layer/substrate interface and the reflected light at the wafer surface (the thickness of (first layer+second layer) obtained by substituting $k_p=0.0831$ into the equation (1): 121.5 μm), and a peak which seems to be based on the interference fringe between the reflected light at the second layer/first layer interface and the reflected light at the wafer surface (the thickness of the second layer obtained by substituting $k_p=0.0780$ into the equation (1): 114.0 μm). Further, according to the MEM analysis of the reflection spectrum in the (MIR+FIR) region in FIG. 2C, two peaks are observed at almost the same position as the MEM-analyzed result in the FIR region. It is apparent from these results that if the far infrared region portion of the reflection spectrum of the sample 1 is frequency-analyzed by the MEM method, the frequency-analyzed peak based on the interference fringe between the reflected light at the second layer/first layer interface and the reflected light at the wafer surface which is not observed from the conventional reflection spectrum in the middle infrared region can be detected.

Figure 3:
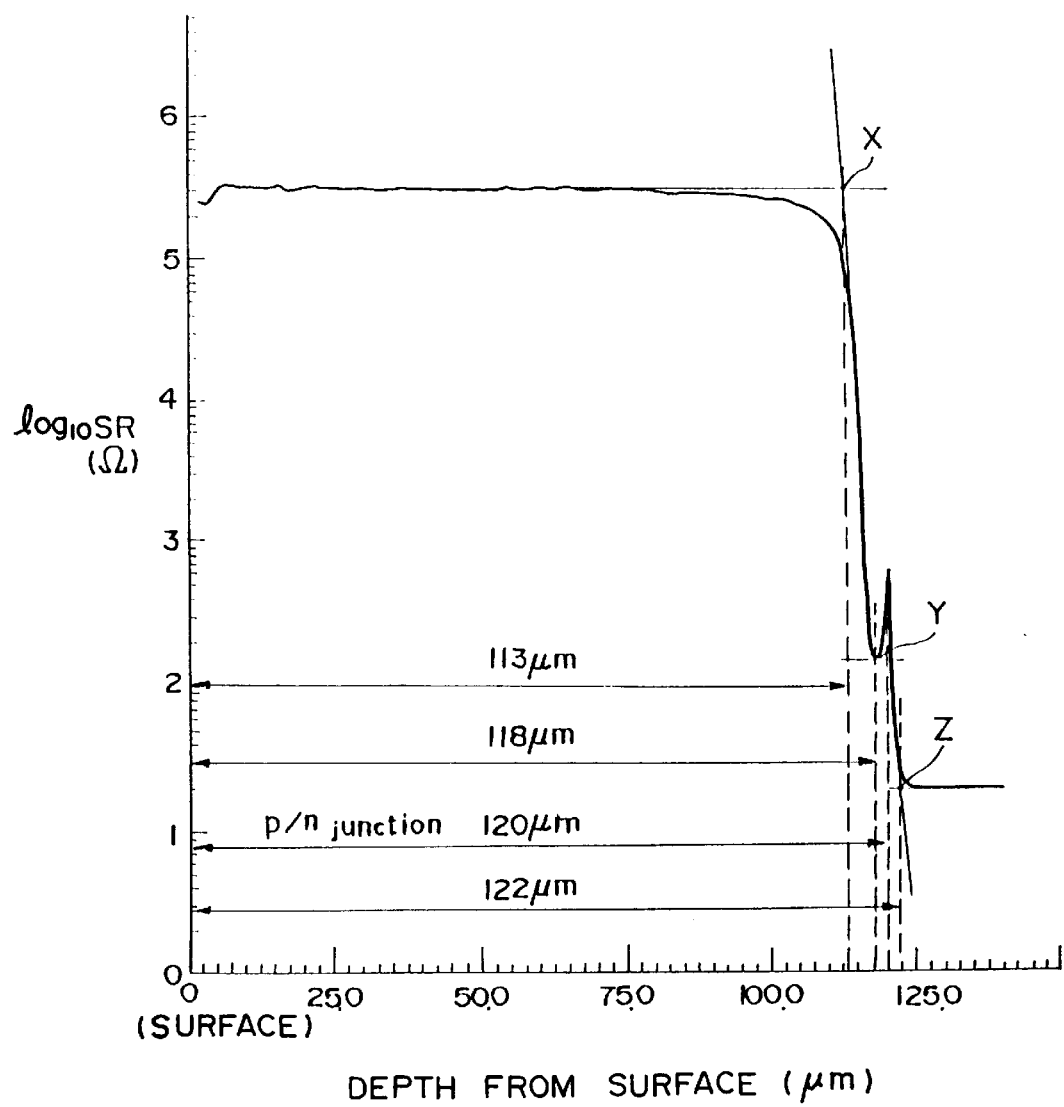
FIG. 3 is a graph showing an SR value profile in the depth direction of the sample 1 of the embodiment according to the present invention.

FIG. 3 shows the profile of the SR value in the depth direction of the measurement of the same sample 1. The profile of FIG. 3 is not a perfect step function, but has a slight inclination due to auto doping or the like which is well known in the vapor epitaxial film forming process. Therefore, it is impossible to determine the epitaxial film thickness of the second layer uniquely. However, the depth at a point at which the SR value starts to decrease and the depth at a point at which the decrease of the SR value has been just finished are equal to 113 μm (X point) and 118 μm (Y point) respectively, and thus it is estimated that the reflection from the second layer/first layer interface occurs between the X point and the Y point. Further, in FIG. 3, it can be observed that the depth until the pn junction serving as the first layer/substrate interface equal to 120 μm, and further the deeper position at which the SR value is constant is located at 122 μm (Z point). Accordingly, the position at a depth of 122 μm (Z point) which is deeper than the pn junction and in which the SR value is fixed may be regarded as an effective value for the reflection at the first layer/substrate interface.

As a result of the measurement and the consideration as described above, upon comparing the epitaxial film thickness of the second layer and that of (the first layer and the second layer) with the corresponding epitaxial film thickness obtained by the SR measurement, these values of the epitaxial film thickness were substantially coincident with each other with an error of 2 to 3 μm. In this case, according to the conventional reflection spectral measurement in the middle infrared region, only the total thickness of the overall epitaxial film thickness of the first and second layers can be measured. On the other hand, according to the present invention, the epitaxial film thickness of each of the two layers can be measured by obtaining the reflection spectrum in the far infrared region. The reflective power of carriers of the epitaxial layer is higher as the carrier concentration increases or the wavenumber is reduced. Therefore, it is considered that the first layer of the sample 1 (specific resistance ρ=about 30 mΩcm) has a lower carrier concentration than the substrate (specific resistance ρ=10 to 20 mΩcm) and it has no sufficient reflective power in the middle infrared region, whereas only the substrate having a higher carrier concentration has sufficient reflective power in this region. Therefore, in the middle infrared region, the reflection at the second layer/first layer interface is weak, and the reflection at the first layer/substrate interface is dominant. Consequently, it is estimated that in the reflection spectrum in this wavenumber region, the amplitude of the interference fringe is monotonically attenuated as the wavenumber region is shifted to a higher wavenumber side. On the other hand, in the far infrared region of 400 cm$^{-1}$ or less, the reflective power of the first layer is high and the reflection at the second layer/first layer interface is also intensified, so that there may appear a node of a beat based on the superposition of the interference fringe between the two kinds of reflected light at the second layer/first layer interface and the first layer/substrate interface. It is said that the epitaxial film thickness value which is obtained on the basis of the SR measurement result is not necessarily obtained with high precision. Therefore, the SR measurement was made on another sample which was sampled from an area near to the above measurement area on the wafer of the sample 1. As a result, the epitaxial film thickness of the second layer measured 112 to 117 μm, and the total epitaxial film thickness of (the first layer+the second layer) measured 121.6 μm by the same measurement method. It is apparent from these measurement values that the result of the MEM method of the far infrared reflection spectrum is coincident with an error of substantially 1 μm.

(Sample 2)

Figure 4:
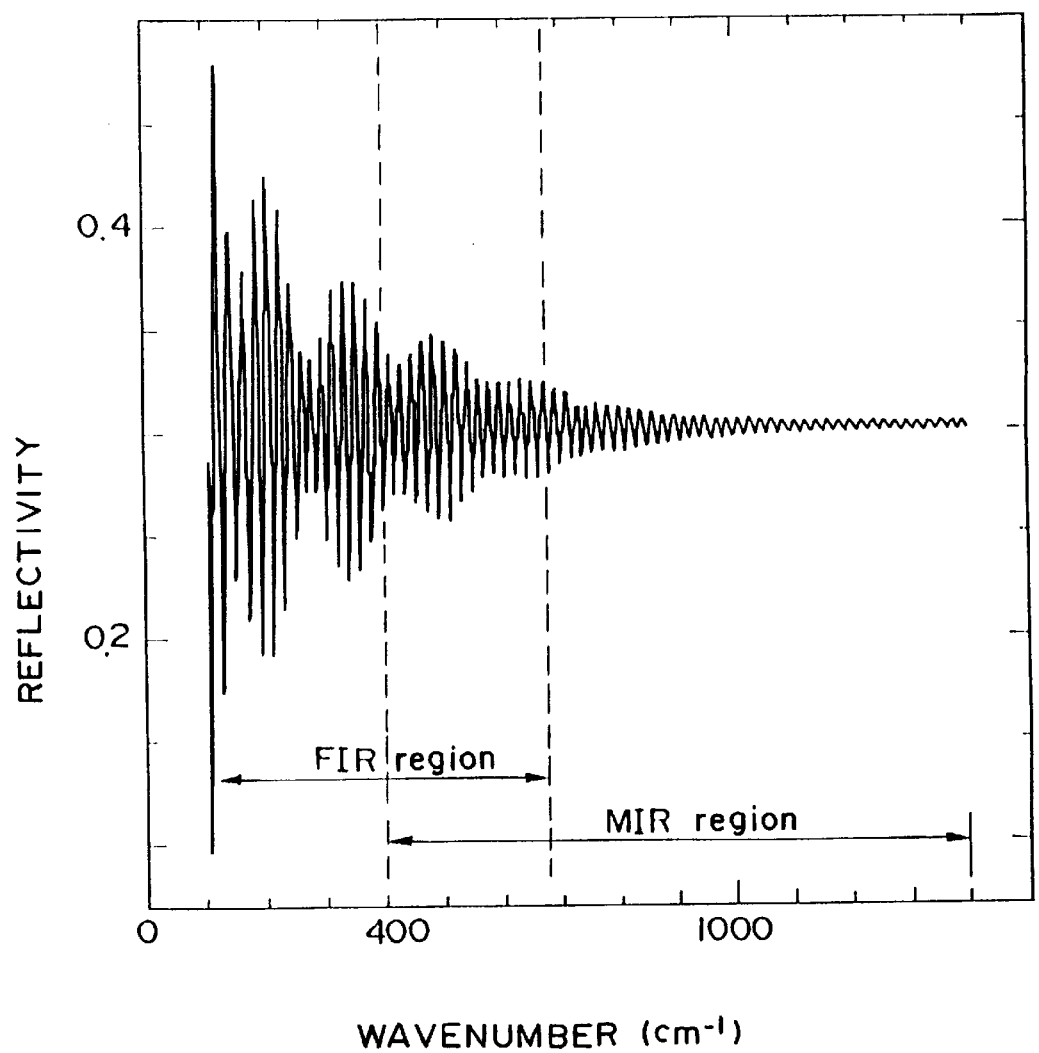
FIG. 4 is a graph showing a reflection spectrum in the range from the middle infrared region to the far infrared region of a sample 2 of the embodiment according to the present invention.
Figure 5A:
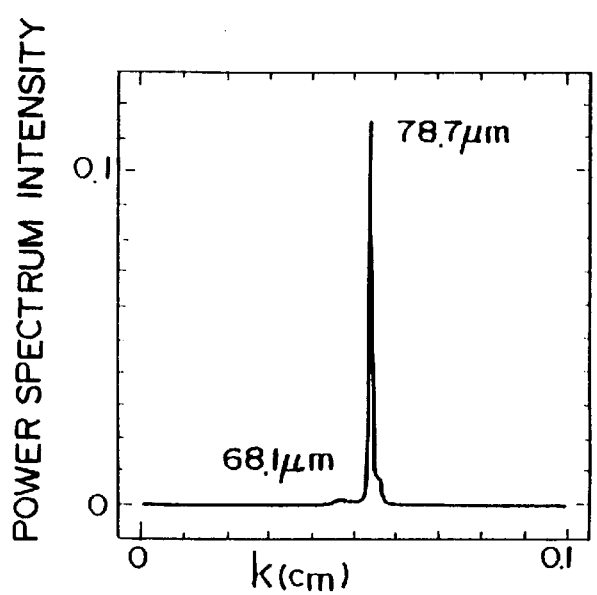
FIGS. 5A to 5C show resultant spectra which are obtained on the basis of the MEM analysis of the reflection spectrum of FIG. 4 in the middle infrared region, in the far infrared region and in the range from the middle infrared region to the far infrared region, respectively.
Figure 5B:
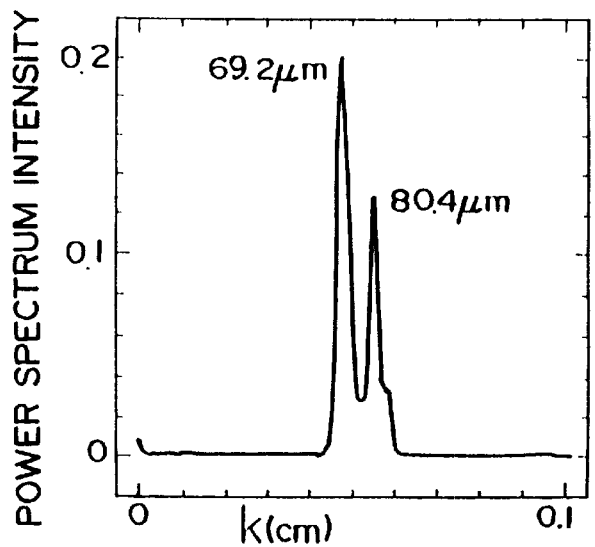
Figure 5C:
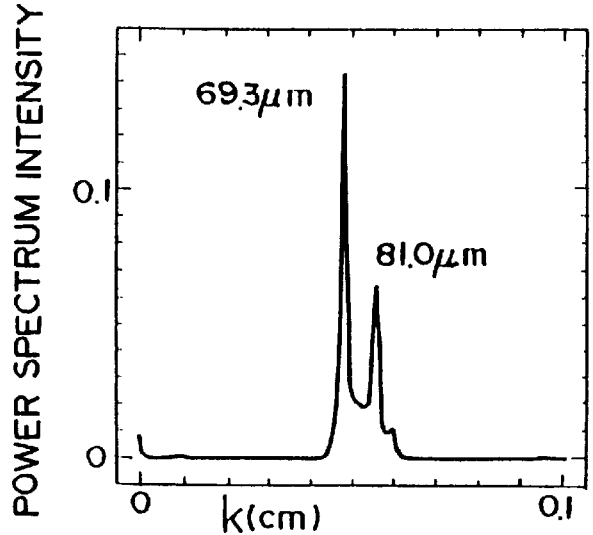

FIG. 4 shows MIR and FIR reflection spectra of a sample 2, FIGS. 5A to 5C show MEM-analyzed spectra of the sample 2, and FIG. 6 shows a SR profile in the depth direction of the sample 2. The MEM-analyzed result and the SR measurement result which were considered in the same manner as the sample 1 are shown in Table 2. It is apparent from the Table 2 that the MEM-analyzed result and the SR result are very coincident with each other and thus each epitaxial film thickness of the two-layer epitaxial wafer can be determined from the reflection spectrum in the far infrared region as in the case of the sample 1. The reproducibility on the result of the SR profile was also considered for the sample 2, and it was found that the coincidence was substantially established with an error of about 3 μm as shown in the Table 2.

(Sample 3)

Figure 7:
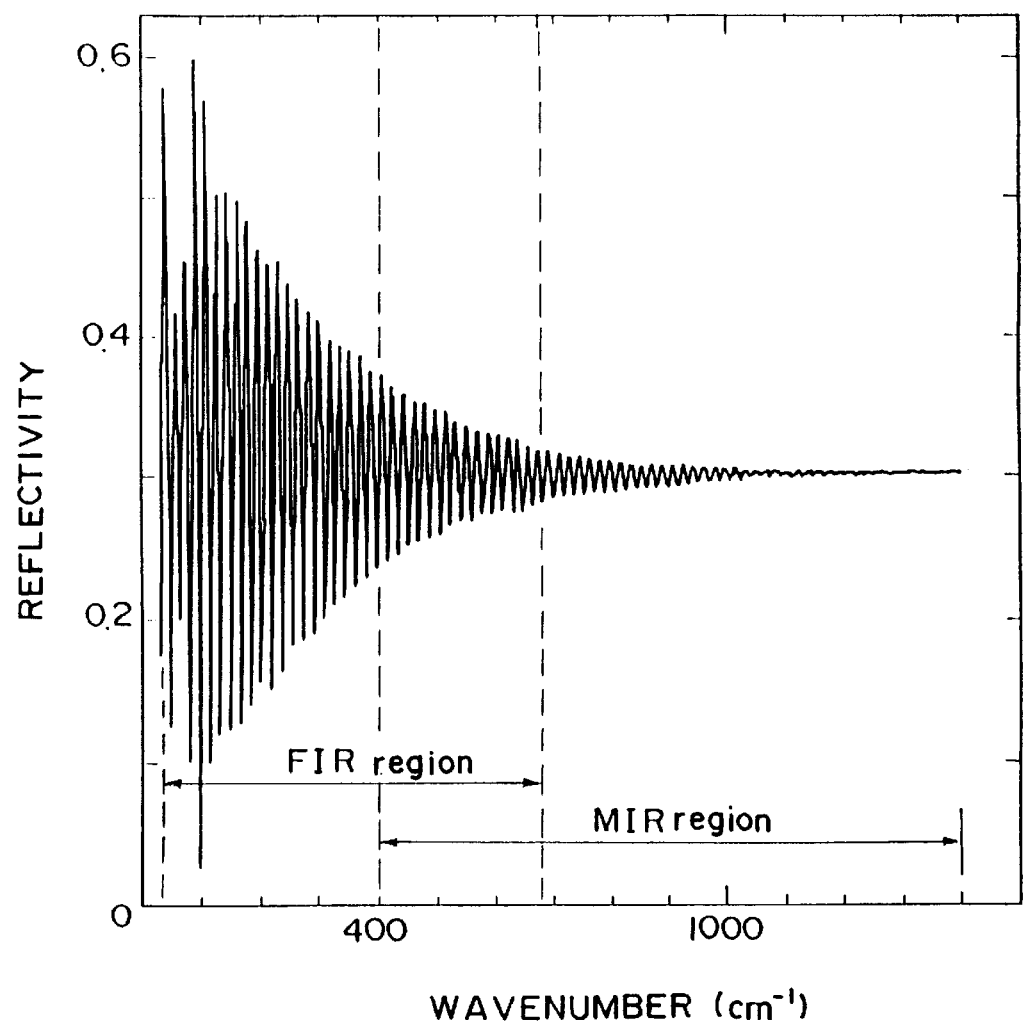
FIG. 7 is a graph showing a reflection spectrum in the range from the middle infrared region to the far infrared region of a sample 3 of the embodiment according to the present invention.
Figure 8A:
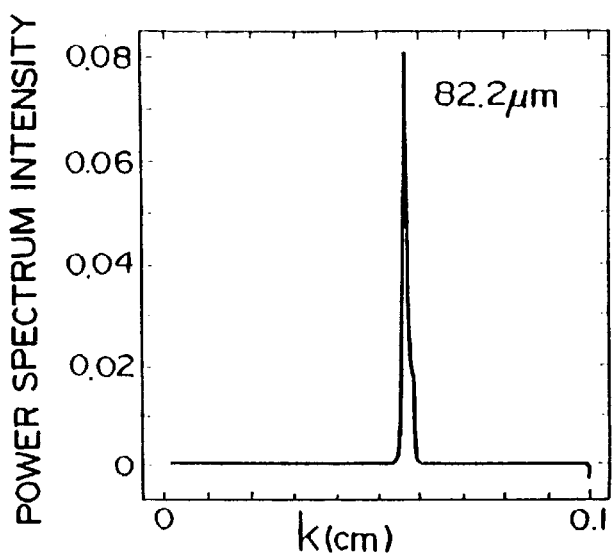
FIGS. 8A to 8C show resultant spectra which are obtained by the MEM analysis of the reflection spectrum of FIG. 7 in the middle infrared region, in the far infrared region and in the range from the middle infrared region to the far infrared region.
Figure 8B:
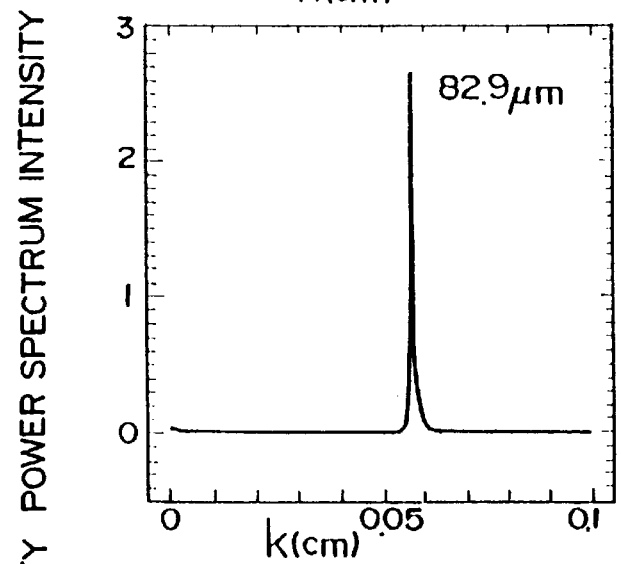
Figure 8C:
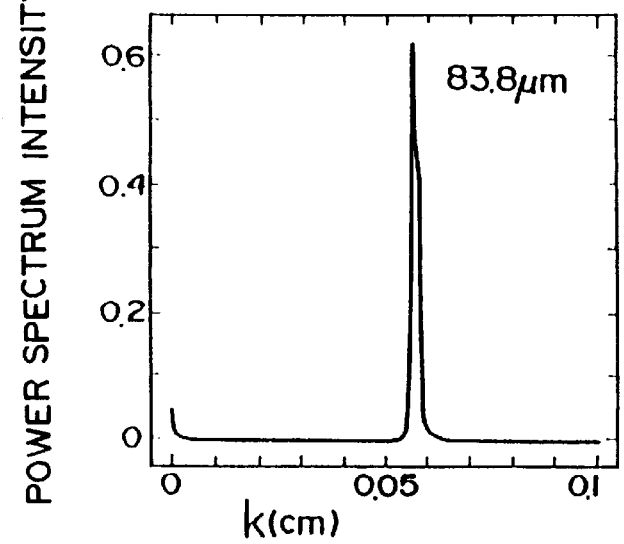
Figure 9:
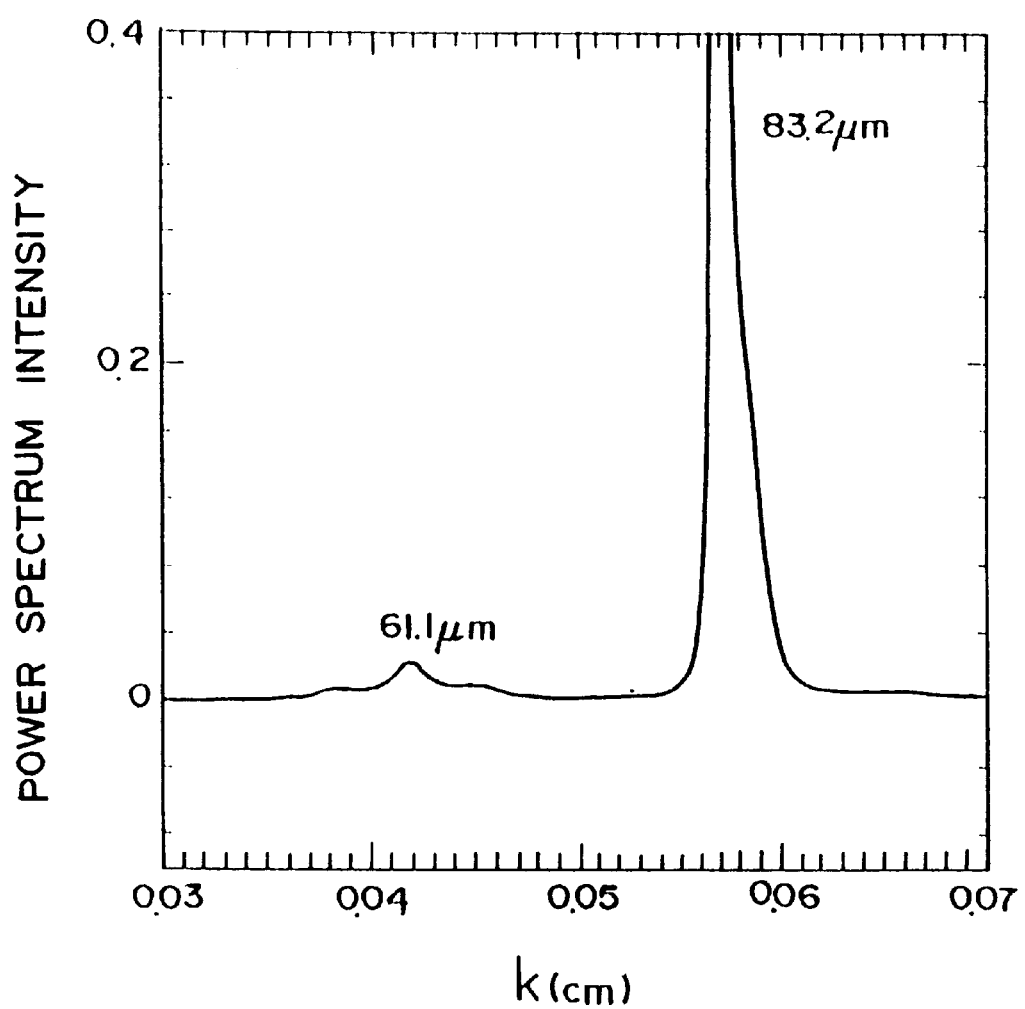
FIG. 9 is a graph showing an resultant spectrum which is obtained by the MEM analysis of the reflection spectrum of FIG. 7 in the range from the middle infrared region to the far infrared region of 1400 to 30 cm$^{-1}$.
Figure 10:
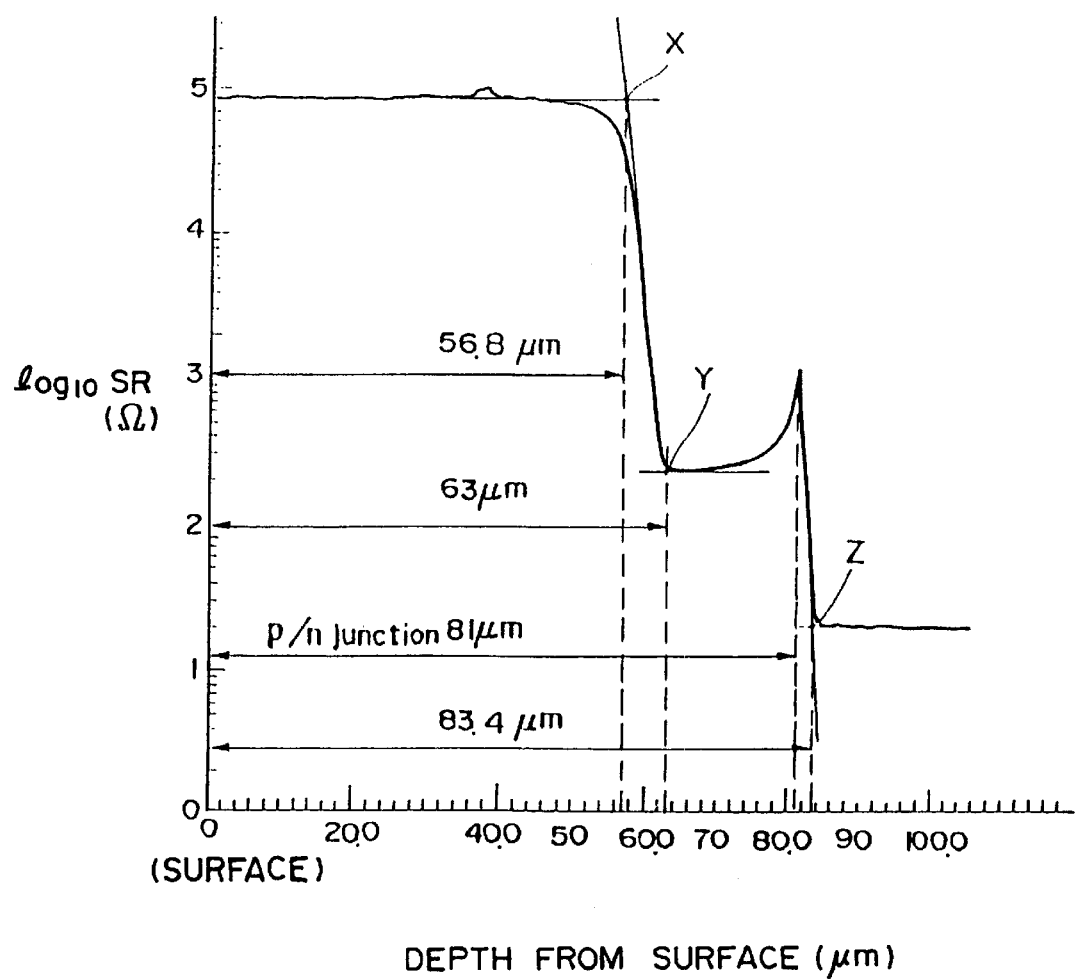
FIG. 10 is a graph showing an SR value profile in the depth direction of the sample 3 of the embodiment according to the present invention.

The first layer of a sample 3 is set to be higher in specific resistance (i.e., 90 mΩcm) than that of the sample 1 and the sample 2. FIG. 7 shows MIR and FIR reflection spectra of the sample 3, FIGS. 8A to 8C and FIG. 9 show MEM-analyzed spectra of the sample 3, and FIG. 10 shows an SR profile in the depth direction of the sample 3. The MEM-analyzed result and the SR measurement result which were considered in the same manner as the sample 1 are shown in Table 2. From this result, in the case of the sample 3, unlike the sample 1 and the sample 2, there was observed no peak corresponding to the interference fringe between the reflected light at the second layer/first layer interface and the reflected light at the wafer surface even when the far infrared reflection until 105 cm$^{-1}$ is performed, and there could be observed any small peak corresponding to the interference fringe between the reflected light at the second layer/first layer interface and the reflected light at the wafer surface by further extending the measurement wavenumber region to 30 cm$^{-1}$ (longer wavelength side). With respect to the reflection spectrum, in the case of the sample 1 and the sample 2, in the region of 100 cm$^{-1}$ or more appeared a node of the beat which was caused by the interference fringe between the reflected light at the first layer/substrate interface and the reflected light at the wafer surface and the interference fringe between the reflected light at the second layer/first layer interface and the reflected light at the wafer surface. However, in the case of the sample 3, the node of the beat was shifted to a lower wavenumber side (for example, it appeared in the region of 100 cm$^{-1}$ or less).

(Samples 4 to 8)

The samples 4 to 8 other than the above three kinds of samples shown in the Table 1 were subjected to the same infrared reflection measurement as described above to obtain reflection spectra. The epitaxial film thickness measurement value of the two-layer epitaxial wafer which was obtained by performing the MEM analysis on the reflection spectra thus obtained and the epitaxial film thickness value which was determined on the basis of the SR measurement are shown in Table 2 for the sample 4, and in Table 3 for the samples 5 to 8.

Figure 11:
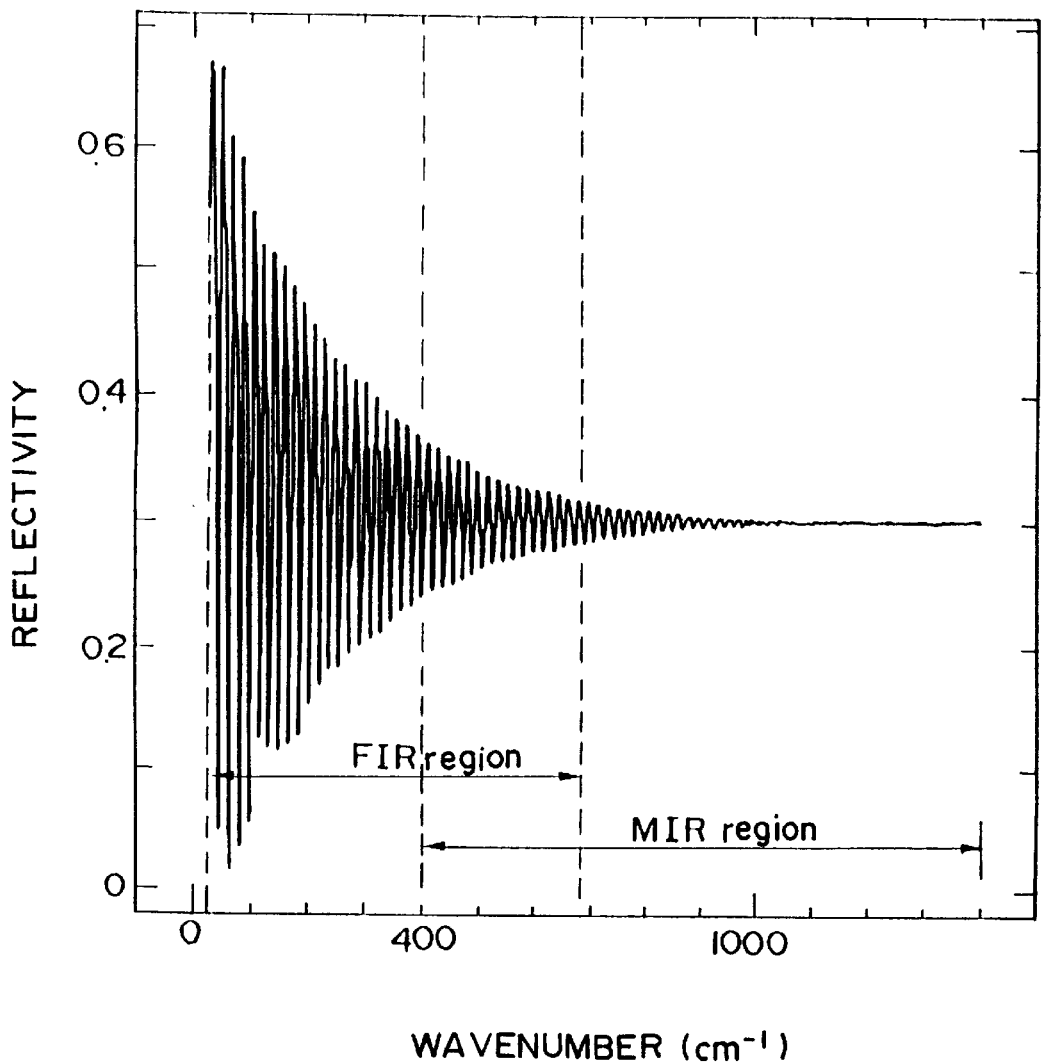
FIG. 11 is a graph showing a reflection spectrum in the range from the middle infrared region to the far infrared region of a sample 4 of the embodiment according to the present invention.
Figure 12B:
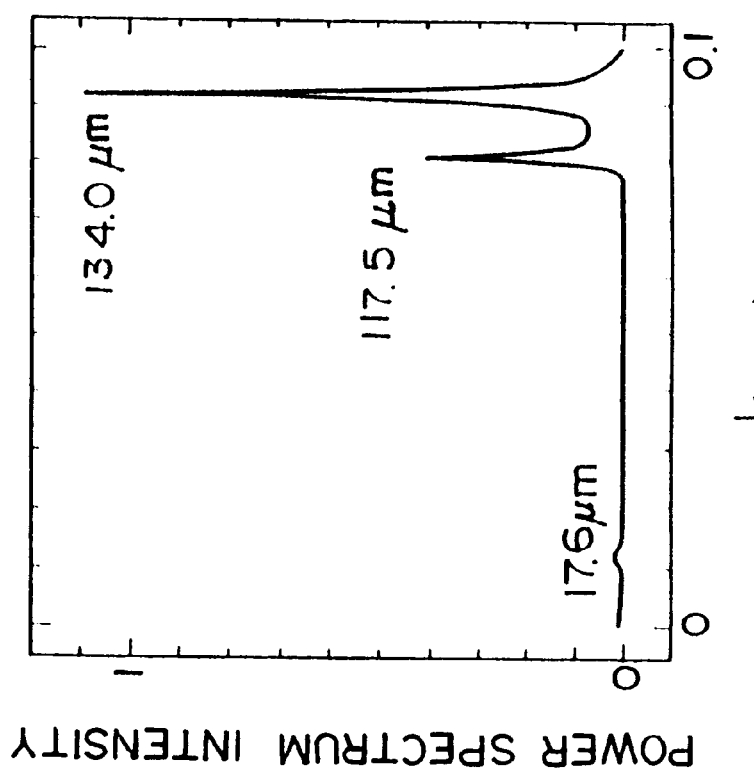
FIG. 12B shows an resultant spectrum of the reflection spectrum of FIG. 12A which is obtained by the MEM analysis.
Figure 12A:
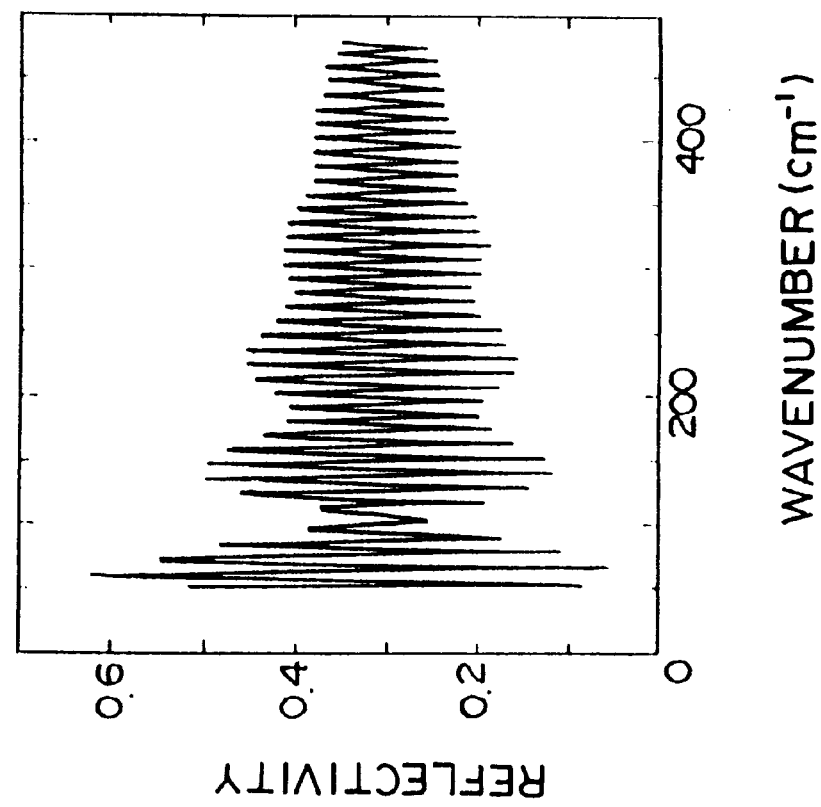
FIG. 12A shows a reflection spectrum in the far infrared region of a sample 9 of the embodiment according to the present invention.
Figure 14B:
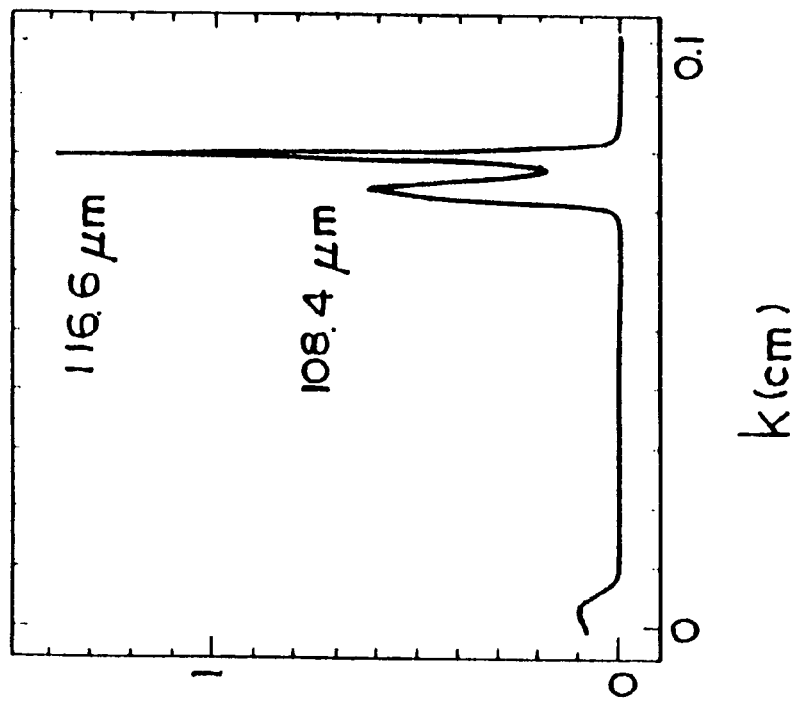
FIG. 14B shows an resultant spectrum of the reflection spectrum of FIG. 14A which is obtained by the MEM analysis.
Figure 14A:
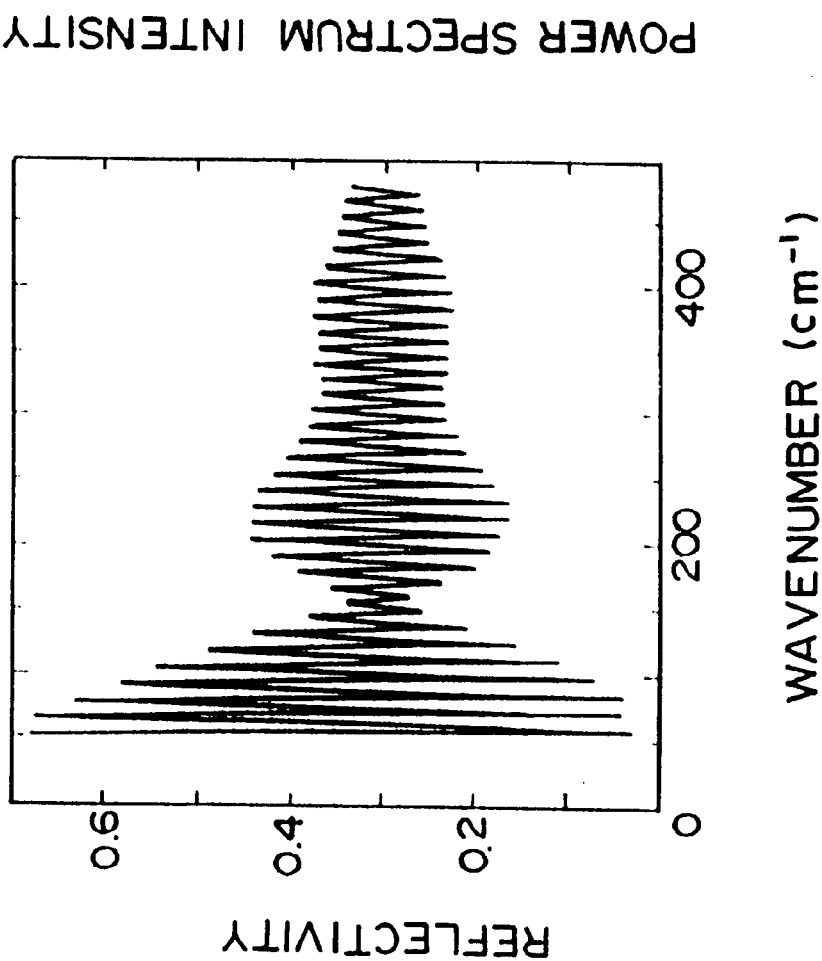
FIG. 14A shows a reflection spectrum in the far infrared region of a sample 11 of the embodiment according to the present invention.
Figure 15B:
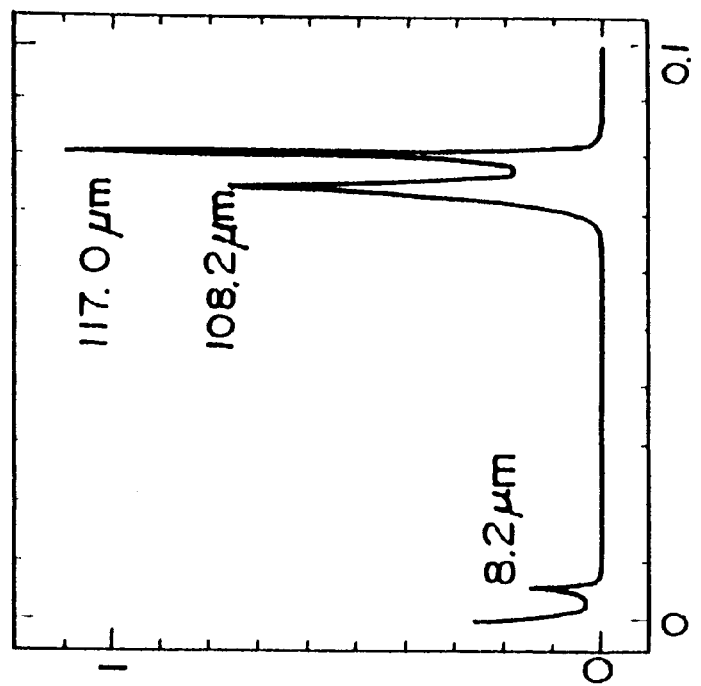
FIG. 15B shows an resultant spectrum of the reflection spectrum of FIG. 15A which is obtained by the MEM analysis.
Figure 15A:
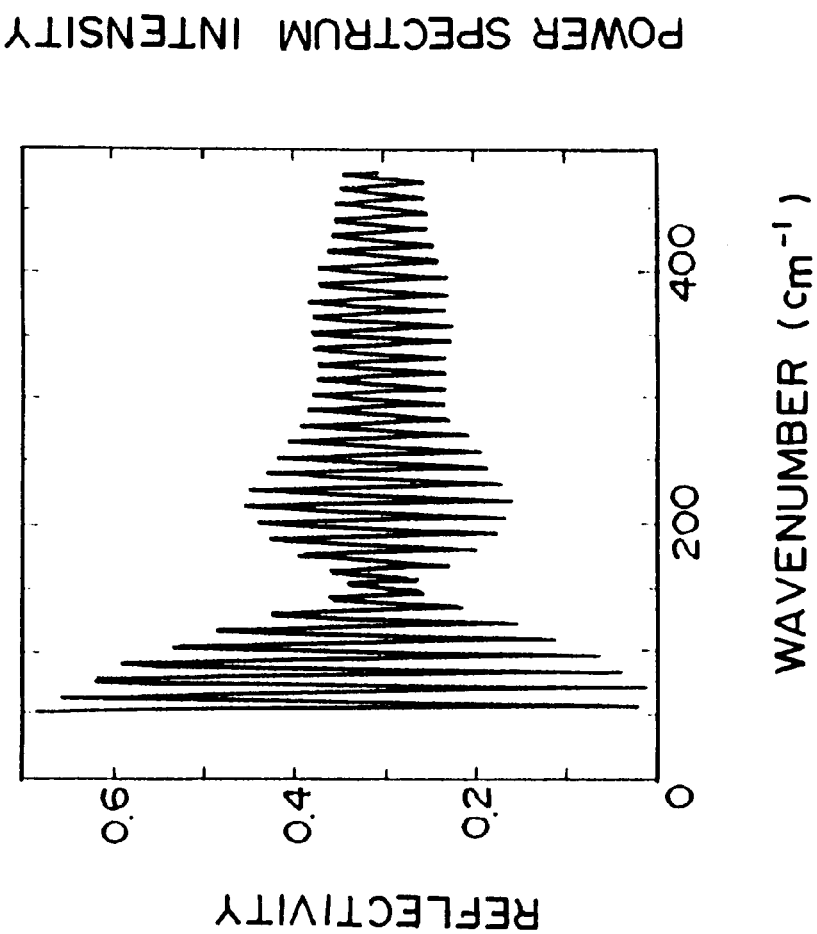
FIG. 15A shows a reflection spectrum in the far infrared region of a sample 12 of the embodiment according to the present invention.
Figure 16A:
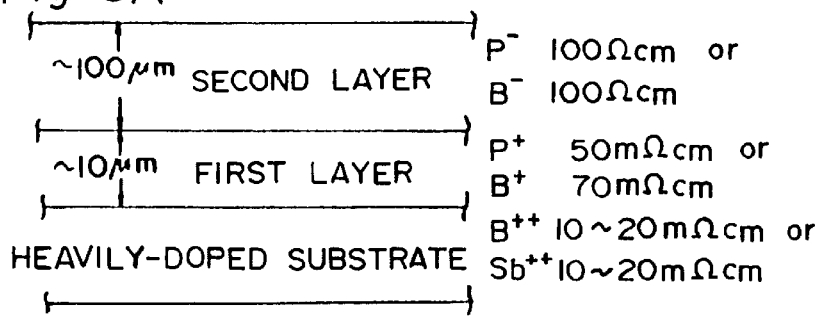
FIG. 16A is a diagram showing the two-layer structure of an IGBT wafer which is a target of the present invention.
Figure 16B:
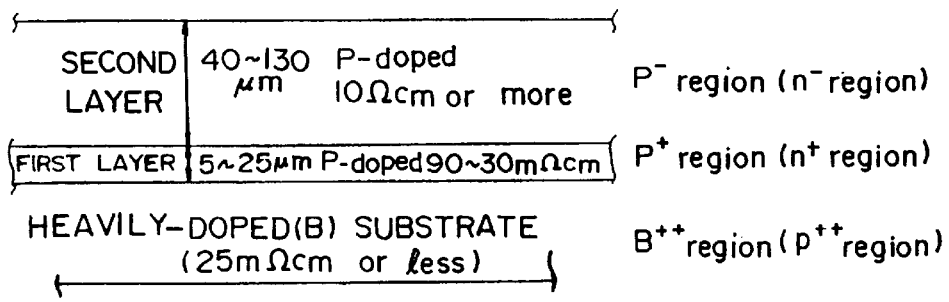
FIG. 16B is a diagram showing a structure of a two-layer epitaxial wafer.
Figure 16C:
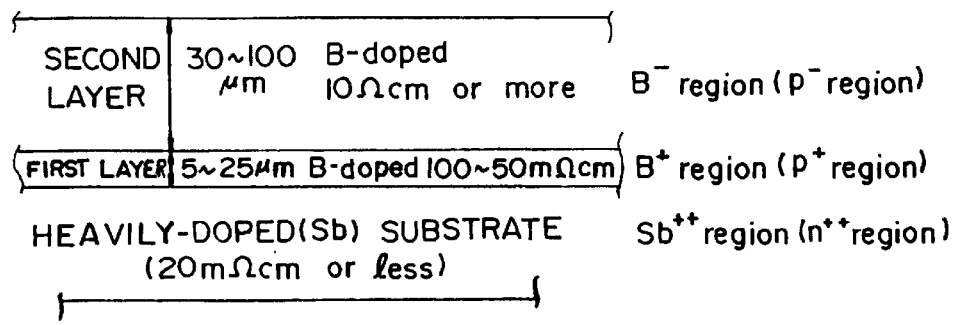
FIG. 16C is a diagram showing another structure of the two-layer epitaxial wafer.
Figure 16D:
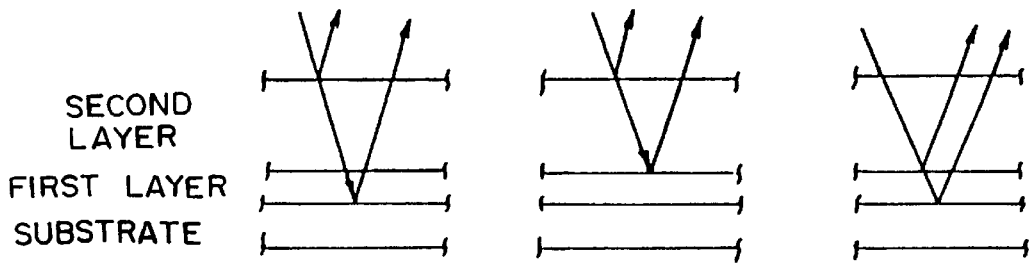
FIG. 16D is a diagram showing reflection of infrared radiation in the two-layer epitaxial wafer.

From the results of the samples 1 to 8, it is apparent that in the case where the resistance of the first layer is equal to about 30 mΩcm, the epitaxial film thickness of the first layer and the total epitaxial film thickness of (the first layer+the second layer) can be determined under the non-destructive and non-contact state by the far infrared reflection measurement until 105 cm$^{-1}$. Further, when the carrier concentration is low to the extent that the resistance of the first layer is equal to about 90 to 100 mΩcm, the epitaxial film thickness of the first layer cannot be determined even by performing the far infrared reflection measurement until 105 cm$^{-1}$ as described above. In such a case, by extending the measurement region to a longer wavelength side (about 30 cm$^{-1}$), an MEM-analyzed peak could be obtained although its intensity is very low if the resistance of the first layer is equal to about 90 mΩcm. Therefore, in this case, the epitaxial film thickness of the first layer can be measured. However, in the case of the sample 4 (about 100 mΩcm), the clear node of the beat as described above is not observed even by extending the measurement region to 30 cm$^{-1}$ as is apparent from the reflection spectrum of FIG. 11, and no MEM-analyzed peak corresponding to the reflection at the second layer/first layer interface is detected. This is because since the carrier concentration of the first layer is remarkably low, the reflective power of the first layer is reduced, and there occurs no sufficient reflection at the second layer/first layer interface unless the measurement region is shifted to a lower wavenumber side.

Embodiment 2

In the same manner as the embodiment 1, each of four kinds of two-layer structure epitaxial wafers (n$^-$/n$^+$/p$^{++}$ structure, dopant: P$^-$/P$^+$/B$^{++}$) was formed on a single crystalline silicon substrate of 10 to 20 mΩcm in specific resistance by the conventional epitaxial method so that target values for the film thickness (Tvg) and the specific resistance (ρ) shown in Table 4 were obtained. The specific resistance of the first layers of all the wafers was set to about 50 mΩcm. The reflection spectrum in the far infrared region of 479 to 50 cm$^{-1}$ was measured for each epitaxial wafer thus obtained under the condition: light source: SiC, beam splitter: Mylar polyester film (6 μm in thickness), detector: DTGS (PE window plate)). FIGS. 12A to FIG. 15B show the far infrared reflection spectra of the two-layer epitaxial wafers of the four kinds of samples (FIGS. 12A, 13A, 14A, 15A) and the MEM-analyzed spectra thereof (FIGS. 12B, 13B, 14B, 15B). The frequency-analysis of the reflection spectra thus measured was performed by using the MEM method, and the epitaxial film thickness d (μm) was calculated according to the equation (1). The MEM-analyzed spectra thereof are shown in the figures and Table 4.

In Table 4, the measurement value (1) represents the thickness of the first layer which is calculated by subtracting the thickness of the second layer from the total thickness of (the first layer+the second layer). The total thickness of (the first layer+the second layer) is obtained from the MEM analysis corresponding to the interference fringe between the reflected light at the first layer/substrate interface and the reflected light at the wafer surface according to the equation (1). The thickness of the second layer is obtained from the MEM peak corresponding to the interference fringe between the reflected light at the second layer/first layer interface and the reflected light at the wafer surface according to the equation (1). The measurement value (2) represents the thickness of the first layer which is obtained from the MEM peak corresponding to the interference fringe between the reflected light at the first layer/substrate interface and the reflected light at the second layer/first layer interface according to the equation (1). As is apparent from this analysis result, both the MEM-analyzed peak corresponding to the interference fringe between the reflected light at the second layer/first layer interface and the reflected light at the wafer surface and the MEM-analyzed peak -corresponding to the interference fringe between the reflected light at the first layer/substrate interface and the reflected light at the wafer surface are observed as being clear for all the samples, and thus each epitaxial film thickness can be determined. Further, except for the sample 11, the MEM-analyzed peak which is estimated to correspond to the interference fringe between the reflected light at the first layer/substrate interface and the reflected light at the second layer/first layer interface is observed, and the measurement value (2) obtained by directly calculating the thickness of the first layer according to the equation (1) is remarkably coincident with the measurement value (1). Accordingly, the thickness of the first layer can be also directly determined from the MEM-analyzed peak corresponding to the interference fringe between the reflected light at the first layer/substrate interface and the reflected light at the second layer/first layer interface. The reason why any clear MEM-analyzed peak corresponding to the first layer does not appear is unclear at the present time.

Table 4

As is apparent from the above embodiment, if the epitaxial wafer is a normal two-layer structure epitaxial wafer, by analyzing the reflection spectrum of the far infrared region of at least 500 cm$^{-1}$ or less according to the MEM method, the analyzed peak corresponding to the interference fringe between the reflected light at the second layer/first layer interface and the reflected at the wafer surface and the interference fringe between the reflected light at the first layer/substrate interface and the reflected light at the wafer surface can be observed as being sharp and clear. Therefore, each epitaxial film thickness on the single crystalline silicon substrate can be determined. Further, the thickness of the first layer can be directly determined from the MEM-analyzed peak corresponding to the interference fringe between the reflected light at the first layer/substrate interface and the reflected light at the second layer/first layer interface.

According to the present invention, for the multilayer epitaxial wafer in which at least two-layer epitaxial films having different electrical characteristics are formed on a single crystalline silicon substrate by epitaxial film formation, reflection spectra are obtained from the multilayer epitaxial wafer with the far infrared region at the center of the measurement region, and the frequency analysis is performed on the reflection spectra thus obtained by the MEM method to determine the epitaxial film thickness of each layer. Accordingly, the thickness of the epitaxial film in the multilayer epitaxial wafer which has a large effect on the device characteristics can be efficiently measured under the non-destructive and non-contact state. Therefore, the control of the epitaxial film thickness can be effectively performed in the manufacturing process of epitaxial wafers.

What is claimed is:

1. A measurement method for measuring the epitaxial film thickness of a multilayer epitaxial wafer comprising of:

(1) a far infrared reflectance measuring step for measuring a reflectance spectrum of a multilayer epitaxial wafer having at least two epitaxial layers of different electric characteristics by using infrared radiation in a far infrared region of at least 500 cm$^{-1}$ or less;

(2) an analyzing step for frequency-analyzing the reflection spectrum obtained in said far infrared reflectance measuring step by a maximum entropy method; and (3) a step for calculating the film thickness of each epitaxial layer on the basis of the analysis spectrum obtained in said analyzing step.

2. The measurement method as claimed in claim 1, wherein the multilayer epitaxial wafer comprises a boron-doped substrate having a specific resistance of 25 mΩcm or less, a phosphorus-doped first epitaxial layer which has a specific resistance of 90 to 30 mΩcm and a thickness of 5 to 25 μm, and a phosphorus-doped second epitaxial layer which has a specific resistance of 10 Ωcm or more and a thickness of 40 to 130 μm.

3. The measurement method as claimed in claim 1, wherein the multilayer epitaxial wafer comprises an antimony-doped substrate having a specific resistance of 20 mΩcm or less, a boron-doped first epitaxial layer which has a specific resistance of 100 to 50 mΩcm and a thickness of 5 to 25 Ωm, and a boron-doped second epitaxial layer which has a specific resistance of 10 Ωcm or more and a thickness of 30 to 100 μm.

TABLE 1

| | | FIRST LAYER | | SECOND LAYER | |
|---|---|---|---|---|---|
| | | TARGET SPECIFIC RESISTANCE (mΩcm) | TARGET FILM THICKNESS (μm) | TARGET SPECIFIC RESISTANCE (mΩcm) | TARGET FILM THICKNESS (μm) |
| SAMPLE NO. | 1 | 30.0 | 5.0 | 150.0 | 115.0 |
| | 2 | 30.0 | 10.0 | 150.0 | 70.0 |
| | 3 | 90.0 | 20.0 | 40.0 | 60.0 |
| | 4 | 100.0 | 10.0 | 150.0 | 70.0 |
| | 5 | 32.9 | 3.0 | 78.0 | 136.4 |
| | 6 | 32.9 | 5.0 | 77.0 | 101.1 |
| | 7 | 26.9 | 10.0 | 69.0 | 100.1 |
| | 8 | 27.9 | 20.0 | 69.0 | 98.4 |

TABLE 2

| | | | MEASURED EPITAXIAL FILM THICKNESS (μm) | | | | | |
|---|---|---|---|---|---|---|---|---|
| | | | RESULT OF MEASUREMENT AND MEM ANALYSIS | | | | | |
| | | | MIR REGION | FIR REGION | MIR + FIR REGION | MIR + FIR REGION | RESULT OF SR MEASUREMENT | |
| SAMPLE NO. | TARGET VALUE OF EPITAXIAL FILM CHARACTERISTIC AT MANUFACTURING | SUBJECTED ITEM OF MEASUREMENT | 1400~ 400 cm$^{-1}$ | 680~ 105 cm$^{-1}$ | 1400~ 105 cm$^{-1}$ | 1400~ 80 cm$^{-1}$ | FIRST TIME | SECOND TIME |
| 1 | TARGET THICKNESS OF FIRST LAYER (μm) | 5.0 THICKNESS OF (FIRST LAYER + SECOND LAYER) (i) (μm) | 119.3 | 121.5 | 121.6 | — | 121.6 | 122.0 |
| | TARGET SPECIFIC RESISTANCE OF FIRST LAYER ρ (mΩcm) | 30.0 THICKNESS OF SECOND LAYER (ii) (μm) | — | 114.0 | 114.0 | — | 112.0~ 117.1 | 113.0~ 118.0 |
| | TARGET THICKNESS OF SECOND LAYER (μm) | 115.0 THICKNESS OF FIRST LAYER (i)–(ii) (μm) | — | 7.5 | 7.6 | — | 4.5~ 9.6 | 4.0~ 9.0 |
| | TARGET SPECIFIC RESISTANCE OF SECOND LAYER ρ (mΩcm) | 150.0 DEPTH OF p/n JUNCTION | | | — | | — | 120.0 |
| 2 | TARGET THICKNESS OF FIRST LAYER (μm) | 10.0 THICKNESS OF (FIRST LAYER + SECOND LAYER) (i) (μm) | 78.7 | 80.4 | 81.0 | — | 82.7 | 80.0 |
| | TARGET SPECIFIC RESISTANCE OF FIRST LAYER ρ (mΩcm) | 30.0 THICKNESS OF SECOND LAYER (ii) (μm) | 68.1 | 69.2 | 69.3 | — | 68.7~ 74.7 | 65.7~ 71.0 |

TABLE 2-continued

| SAMPLE NO. | TARGET VALUE OF EPITAXIAL FILM CHARACTERISTIC AT MANUFACTURING | | SUBJECTED ITEM OF MEASUREMENT | MEASURED EPITAXIAL FILM THICKNESS ($\mu$m) | | | | | |
|---|---|---|---|---|---|---|---|---|---|
| | | | | RESULT OF MEASUREMENT AND MEM ANALYSIS | | | | RESULT OF SR MEASUREMENT | |
| | | | | MIR REGION 1400~400 cm$^{-1}$ | FIR REGION 680~105 cm$^{-1}$ | MIR + FIR REGION 1400~105 cm$^{-1}$ | MIR + FIR REGION 1400~80 cm$^{-1}$ | FIRST TIME | SECOND TIME |
| | TARGET THICKNESS OF SECOND LAYER ($\mu$m) | 70.0 | THICKNESS OF FIRST LAYER (i)–(ii) ($\mu$m) | 10.6 | 11.2 | 11.7 | — | 8.0~14.6 | 9.0~14.3 |
| | TARGET SPECIFIC RESISTANCE OF SECOND LAYER $\rho$ (m$\Omega$cm) | 150.0 | DEPTH OF p/n JUNCTION | | | — | | — | 78.0 |
| 3 | TARGET THICKNESS OF FIRST LAYER ($\mu$m) | 20.0 | THICKNESS OF (FIRST LAYER + SECOND LAYER) (i) ($\mu$m) | 82.2 | 82.9 | 83.8 | 83.2 | — | 83.4 |
| | TARGET SPECIFIC RESISTANCE OF FIRST LAYER $\rho$ (m$\Omega$cm) | 90.0 | THICKNESS OF SECOND LAYER (ii) ($\mu$m) | — | — | — | 61.1 | — | 56.8~63.0 |
| | TARGET THICKNESS OF SECOND LAYER ($\mu$m) | 60.0 | THICKNESS OF FIRST LAYER (i)–(ii) ($\mu$m) | — | — | — | 22.1 | — | 20.4~26.6 |
| | TARGET SPECIFIC RESISTANCE OF SECOND LAYER $\rho$ (m$\Omega$cm) | 40.0 | DEPTH OF p/n JUNCTION | | | — | | — | 81.1 |
| 4 | TARGET THICKNESS OF FIRST LAYER ($\mu$m) | 10.0 | THICKNESS OF (FIRST LAYER + SECOND LAYER) (i) ($\mu$m) | 81.4 | 81.9 | 81.7 | 81.1 | — | 82.0 |
| | TARGET SPECIFIC RESISTANCE OF FIRST LAYER $\rho$ (m$\Omega$cm) | 100.0 | THICKNESS OF SECOND LAYER (ii) ($\mu$m) | — | — | — | — | — | 63.3~73.0 |
| | TARGET THICKNESS OF SECOND LAYER ($\mu$m) | 70.0 | THICKNESS OF FIRST LAYER (i)–(ii) ($\mu$m) | — | — | — | — | — | 9.0~18.7 |
| | TARGET SPECIFIC RESISTANCE OF SECOND LAYER $\rho$ (m$\Omega$cm) | 150.0 | DEPTH OF p/n JUNCTION | | | — | | — | 80.0 |

TABLE 3

| SAMPLE NO. | TARGET VALUE OF EPITAXIAL FILM CHARACTERISTIC AT MANUFACTURING | | SUBJECTED ITEM OF MEASUREMENT | MEASURED EPITAXIAL FILM THICKNESS ($\mu$m) | | | | RESULT OF SR MEASUREMENT |
|---|---|---|---|---|---|---|---|---|
| | | | | RESULT OF MEASUREMENT AND MEM ANALYSIS | | | | |
| | | | | MIR REGION 1400~400 cm$^{-1}$ | FIR REGION 680~105 cm$^{-1}$ | MIR + FIR REGION 1400~105 cm$^{-1}$ | MIR + FIR REGION 1400~30 cm$^{-1}$ | |
| 5 | TARGET THICKNESS OF FIRST LAYER ($\mu$m) | 3.0 | THICKNESS OF (FIRST LAYER + SECOND LAYER) (i) ($\mu$m) | 138.7 | 141.2 | 141.0 | — | 143.7 |
| | TARGET SPECIFIC RESISTANCE OF FIRST LAYER $\rho$ (m$\Omega$cm) | 32.9 | THICKNESS OF SECOND LAYER (ii) ($\mu$m) | — | 136.8 | 136.4 | — | 135.5~140.8 |
| | TARGET THICKNESS OF SECOND LAYER ($\mu$m) | 136.4 | THICKNESS OF FIRST LAYER (i)–(ii) ($\mu$m) | — | 4.4 | 4.6 | — | 2.9~8.2 |
| | TARGET SPECIFIC RESISTANCE OF SECOND LAYER $\rho$ (m$\Omega$cm) | 78.0 | DEPTH OF p/n JUNCTION | | | — | | 142.1 |
| 6 | TARGET THICKNESS OF FIRST LAYER ($\mu$m) | 5.0 | THICKNESS OF (FIRST LAYER + SECOND LAYER) (i) ($\mu$m) | 107.7 | 107.3 | 106.0 | — | 110.0 |
| | TARGET SPECIFIC RESISTANCE OF FIRST LAYER $\rho$ (m$\Omega$cm) | 32.9 | THICKNESS OF SECOND LAYER (ii) ($\mu$m) | 105.2 | 100.5 | 100.3 | — | 99.7~105.6 |

TABLE 3-continued

| SAMPLE NO. | TARGET VALUE OF EPITAXIAL FILM CHARACTERISTIC AT MANUFACTURING | | SUBJECTED ITEM OF MEASUREMENT | MEASURED EPITAXIAL FILM THICKNESS ($\mu m$) | | | | RESULT OF SR MEASUREMENT |
|---|---|---|---|---|---|---|---|---|
| | | | | RESULT OF MEASUREMENT AND MEM ANALYSIS | | | | |
| | | | | MIR REGION 1400~400 $cm^{-1}$ | FIR REGION 680~105 $cm^{-1}$ | MIR + FIR REGION 1400~105 $cm^{-1}$ | MIR + FIR REGION 1400~30 $cm^{-1}$ | |
| | TARGET THICKNESS OF SECOND LAYER ($\mu m$) | 101.1 | THICKNESS OF FIRST LAYER (i)–(ii) ($\mu m$) | 2.5 | 6.8 | 5.7 | — | 4.4~10.3 |
| | TARGET SPECIFIC RESISTANCE OF SECOND LAYER $\rho$ (m$\Omega$cm) | 77.0 | DEPTH OF p/n JUNCTION | | | — | | 108.0 |
| 7 | TARGET THICKNESS OF FIRST LAYER ($\mu m$) | 10.0 | THICKNESS OF (FIRST LAYER + SECOND LAYER) (i) ($\mu m$) | 109.0 | 111.8 | 111.9 | — | 113.7 |
| | TARGET SPECIFIC RESISTANCE OF FIRST LAYER $\rho$ (m$\Omega$cm) | 26.9 | THICKNESS OF SECOND LAYER (ii) ($\mu m$) | 100.7 | 99.6 | 98.8 | — | 99.4~104.9 |
| | TARGET THICKNESS OF SECOND LAYER ($\mu m$) | 100.1 | THICKNESS OF FIRST LAYER (i)–(ii) ($\mu m$) | 8.3 | 12.2 | 13.1 | — | 8.8~14.3 |
| | TARGET SPECIFIC RESISTANCE OF SECOND LAYER $\rho$ (m$\Omega$cm) | 69.0 | DEPTH OF p/n JUNCTION | | | — | | 112.2 |
| 8 | TARGET THICKNESS OF FIRST LAYER ($\mu m$) | 20.0 | THICKNESS OF (FIRST LAYER + SECOND LAYER) (i) ($\mu m$) | 119.6 | 120.0 | 118.5 | — | 119.3 |
| | TARGET SPECIFIC RESISTANCE OF FIRST LAYER $\rho$ (m$\Omega$cm) | 27.9 | THICKNESS OF SECOND LAYER (ii) ($\mu m$) | 100.1 | 99.8 | 99.1 | — | 94.5~100.0 |
| | TARGET THICKNESS OF SECOND LAYER ($\mu m$) | 98.4 | THICKNESS OF FIRST LAYER (i)–(ii) ($\mu m$) | 19.5 | 20.2 | 19.4 | — | 19.3~24.8 |
| | TARGET SPECIFIC RESISTANCE OF SECOND LAYER $\rho$ (m$\Omega$cm) | 69.0 | DEPTH OF p/n JUNCTION | | | — | | 117.3 |

TABLE 4

| | | | FIRST LAYER | | | SECOND LAYER | |
|---|---|---|---|---|---|---|---|
| | | | | Tvg ($\mu m$) | | | Tvg ($\mu m$) |
| | | $\rho$ (m$\Omega$cm) | TARGET VALUE | MEASURED VALUE ① | MEASURED VALUE ② | TARGET VALUE | MEASURED VALUE |
| SAMPLE NO. | 9 | 47.4 | 14.7 | 16.5 | 17.6 | 117.0 | 117.5 |
| | 10 | 47.9 | 14.7 | 17.6 | 16.5 | 112.7 | 117.5 |
| | 11 | 48.2 | 10.4 | 8.2 | — | 104.4 | 108.4 |
| | 12 | 48.2 | 10.4 | 8.8 | 8.2 | 104.7 | 108.2 |

* * * * *